United States Patent
Imakoga

(10) Patent No.: US 10,169,857 B2
(45) Date of Patent: Jan. 1, 2019

(54) IMAGE INSPECTION APPARATUS, IMAGE INSPECTION METHOD, IMAGE INSPECTION PROGRAM, AND COMPUTER-READABLE RECORDING MEDIUM AND RECORDING DEVICE

(71) Applicant: Keyence Corporation, Osaka (JP)

(72) Inventor: Kenta Imakoga, Osaka (JP)

(73) Assignee: Keyence Corporation, Osaka (JP)

( * ) Notice: Subject to any disclaimer, the term of this patent is extended or adjusted under 35 U.S.C. 154(b) by 11 days.

(21) Appl. No.: 15/663,170

(22) Filed: Jul. 28, 2017

(65) Prior Publication Data

US 2018/0068433 A1 Mar. 8, 2018

(30) Foreign Application Priority Data

Sep. 6, 2016 (JP) ................. 2016-174092

(51) Int. Cl.
*G06K 9/00* (2006.01)
*G06T 7/00* (2017.01)
(Continued)

(52) U.S. Cl.
CPC .......... *G06T 7/0008* (2013.01); *G06F 3/0482* (2013.01); *G06F 3/04847* (2013.01); *G06T 2200/24* (2013.01); *G06T 2207/10012* (2013.01); *G06T 2207/10152* (2013.01); *G06T 2207/30164* (2013.01)

(58) Field of Classification Search
CPC ......... G06T 7/0008; G06T 2207/30164; G06T 2207/10152; G06T 2207/10012; G06T 2200/24; G06F 3/0482; G06F 3/04847
See application file for complete search history.

(56) References Cited

U.S. PATENT DOCUMENTS 9,494,528 B2 11/2016 Matsuda
9,571,817 B2 2/2017 Mayumi
(Continued)

FOREIGN PATENT DOCUMENTS

JP 2007-206797 8/2007

OTHER PUBLICATIONS

U.S. Appl. No. 15/586,301, filed May 4, 2017 (97 pages).
U.S. Appl. No. 15/586,303, filed May 4, 2017 (94 pages).

*Primary Examiner* — Samir Ahmed
(74) *Attorney, Agent, or Firm* — Kilyk & Bowersox, P.L.L.C.

(57) ABSTRACT

An image inspection apparatus includes: a parameter setting unit that automatically sets a value of a first parameter among a plurality of image processing parameters; an image generation unit that generates a processed image with each of a plurality of second parameter candidate values obtained by changing a value of a second parameter; a display unit that displays a second parameter candidate list image group in which a plurality of processed images are listed; an image selection unit that receives a selection of any one of the processed images included in the second parameter candidate list image group displayed on the display unit; and a determination unit that outputs a determination result of the visual inspection. The parameter setting unit sets a second parameter candidate value corresponding to the processed image selected by the image selection unit as the second parameter.

22 Claims, 14 Drawing Sheets

(51) Int. Cl.
G06F 3/0482 (2013.01)
G06F 3/0484 (2013.01)

(56) References Cited

U.S. PATENT DOCUMENTS

| | | |
|---|---|---|
| 9,683,943 B2 | 6/2017 | Ando |
| 9,689,806 B2 | 6/2017 | Matsuda |
| 2004/0184031 A1* | 9/2004 | Vook .................... G06T 7/0002 356/237.1 |
| 2007/0176927 A1* | 8/2007 | Kato ...................... G06T 7/586 345/426 |
| 2010/0246174 A1* | 9/2010 | Ido ..................... G01N 21/8806 362/235 |
| 2014/0152990 A1* | 6/2014 | Ehbets ..................... G01J 3/50 356/405 |
| 2015/0355104 A1* | 12/2015 | Matsuda ............ G01N 21/8806 356/237.2 |
| 2017/0098300 A1 | 4/2017 | Mayumi |
| 2017/0236269 A1 | 8/2017 | Ando |
| 2017/0254758 A1 | 9/2017 | Matsuda |

* cited by examiner

FIG. 4

| | | |
|---|---|---|
| CHARACTERISTIC SIZE | 004 | — 32B1 |
| CHARACTERISTIC SIZE MARGIN DEGREE | 2 | — 32B2 |
| CONTRAST | 1.0 | — 32B3 |
| LEVEL | 128 | — 32B4 |
| NOISE REMOVAL | 000.0 | — 32B5 |

| DETECTION CONDITION SETTING | | |
|---|---|---|
| DETECTION DIRECTION | XY ▼ | — 32C1 |
| DIRECTION-CLASSIFIED SETTING | OFF ▼ | — 32C2 |
| HIGH-SPEED MODE | ON ▼ | — 32C3 |
| FLAW LEVEL | 010 | — 32C4 |
| SETTING DIRECTION | X/Y COMMON | — 32C5 |
| SEGMENT SIZE | 016 | — 32C6 |
| COMPARISON INTERVAL SETTING | MANUAL ▼ | — 32C7 |
|   MOVING AMOUNT | 0004 | — 32C8 |
|   COMPARISON SEGMENT INTERVAL | 0001 | — 32C9 |
| LIGHTNESS INFORMATION EXCLUSION | OFF ▼ | |

IMAGE INSPECTION APPARATUS, IMAGE INSPECTION METHOD, IMAGE INSPECTION PROGRAM, AND COMPUTER-READABLE RECORDING MEDIUM AND RECORDING DEVICE

CROSS-REFERENCE TO RELATED APPLICATIONS

The present application claims foreign priority based on Japanese Patent Application No. 2016-174092, filed Sep. 6, 2016, the contents of which is incorporated herein by reference.

BACKGROUND OF THE INVENTION

1. Field of the Invention

The present invention relates to an image inspection apparatus that uses an image inspection such as a photometric stereo method or a flaw inspection, an image inspection method, an image inspection program, and a computer-readable recording medium or a recording device.

2. Description of Related Art

There has been used an image inspection apparatus that performs an inspection of the presence or absence of a flaw on the surface of a workpiece (an inspection object or a subject), the suitability of the appearance shape thereof, or reading of a printed character thereon. Such an image inspection apparatus applies necessary illumination light to a workpiece to capture an image thereof, performs image processing such as edge detection on the obtained image data, and performs determination such as quality determination on the basis of a result thereof. In particular, an image inspection apparatus that is capable of acquiring a height image by three-dimensionally grasping a stereoscopic shape can stably perform a three-dimensional visual inspection which is difficult to perform by an image inspection based on a conventional two-dimensional optical image and thus has high usability.

However, in such an image inspection apparatus, the viewing easiness may vary according to the type of illumination or the illumination direction depending on the type of a workpiece. Thus, in order to perform an appropriate inspection on such a workpiece, a user requires sufficient knowledge and experience. In other words, there is an obstacle for a user who is not conversant in the operation.

Further, in a conventional image inspection apparatus, erroneous detection becomes likely to occur by only a small change in the illumination condition, the installation condition or the like, and it is not easy to stably perform an image inspection, which has been problematic. Further, in the visual inspection of a workpiece, information relating to the shape of the workpiece such as a flaw or an edge, that is, three-dimensional information and planar information such as a printed character or a stain are both objects of the inspection, and the three-dimensional information and the planar information cannot be detected well in some cases as a result of relation and interference therebetween, which has also been problematic.

As a technique for solving such problems, there is known an image inspection apparatus that acquires information of a three-dimensional shape such as height using a photometric stereo method (e.g., refer to JP 2007-206797 A). The photometric stereo method is also called an illuminance difference stereo method and is one of three-dimensional measurement techniques that capture images illuminated from a plurality of different illumination directions and obtain a normal vector of a workpiece from shadow information thereof.

An image inspection apparatus that uses such a photometric stereo method creates, from a normal vector (corresponding to an inclination image), an image with X-axis and Y-axis components replaced with a luminance value or a reflectance image (corresponding to an albedo image), and applies the image to an image inspection. Here, in order to accurately perform three-dimensional measurement by the photometric stereo method, consideration has been made mainly on a method for installation of an illumination device and a method for application of illumination light.

Various inspections with respect to an inspection object such as a flaw inspection, a determination of the presence or absence of a workpiece, and OCR are performed using such an image processing apparatus. When such an inspection is performed, it is necessary to appropriately set image processing parameters according to inspection purposes. In order to set parameters, typically, a numerical value is input to each of the parameters on a setting screen, or selection from options is performed in a check box or a drop-down menu.

However, in a parameter setting method in a conventional image processing apparatus, it is necessary for a user to check whether parameter setting is suitable for the inspection while checking images generated by changing parameters by himself or herself one by one. Therefore, disadvantageously, it is necessary for a user to grasp the meaning of each parameter in the image processing, and the degree of difficulty is thus high.

On the other hand, there is also known an image processing apparatus that analyzes images by changing a value of each parameter and automatically derives optimal parameter setting (e.g., refer to JP 2007-206797 A). However, what kind of processed image corresponds to the optimal image processing parameter setting depends on an inspection purpose desired by a user. Thus, a case in which the image processing parameters can be automatically set using such an apparatus is limited to a specific purpose or apparatus.

SUMMARY OF THE INVENTION

The present invention has been made in view of such circumstances, and one object thereof is to provide an image inspection apparatus, an image inspection method, an image inspection program, and a computer-readable recording medium or a recording device, each enabling an easy parameter setting operation in an inspection using image processing.

According to one embodiment of the invention, an image inspection apparatus is for performing a visual inspection of an inspection object. The image inspection apparatus may include: an image input unit for receiving input of an image of the inspection object; an inspection type selection unit for receiving a selection of a desired inspection type from a plurality of inspection types previously prepared as candidates for the visual inspection of the inspection object; a parameter setting unit for automatically setting a value of a first parameter according to the inspection type selected by the inspection type selection unit among a plurality of image processing parameters relating to image processing performed on the inspection object image; an image generation unit for generating a plurality of processed images by changing a value of a second parameter different from the first parameter to a plurality of candidate values and performing image processing on the inspection object image with each of the changed second parameter candidate values; a display unit for displaying a second parameter candidate list image group in which the plurality of processed images generated by the image generation unit are listed and displayed; an image selection unit for receiving a selection of any one of the plurality of processed images included in the second parameter candidate list image group displayed on the display unit; and a determination unit for outputting a determination result of the visual inspection. The parameter setting unit sets a second parameter candidate value corresponding to the processed image selected by the image selection unit as the second parameter, predetermined image processing is performed on the processed image generated by the image generation unit, and the determination unit outputs the determination result on the basis of a result of the processing. With the above configuration, displaying the processed images obtained on the basis of the plurality of different second parameter candidate values as a list enables a user to select a desired image from the listed processed images and to perform image processing using the second parameter candidate value that is set in the selected processed image. Thus, it is possible to obtain an advantage that setting to the second parameter that enables desired image processing to be obtained can be easily performed on the basis of the obtained processed image without understanding the detailed meaning of the second parameter.

According to another embodiment of the invention, in addition to the above configuration, the image inspection apparatus may further include: three or more illumination units for illuminating the inspection object from mutually different illumination directions; an illumination control unit for turning on the three or more illumination units one by one in a predetermined turning-on order; and an imaging unit for capturing an image of the inspection object from a certain direction at illumination timing of turning on each of the illumination units by the illumination control unit to capture a plurality of partial illumination images. The plurality of partial illumination images captured by the imaging unit may be input to the image input unit and a shape image having a pixel value corresponding to shape may be generated on the basis of the plurality of partial illumination images in accordance with a principle of a photometric stereo method, the first parameter may define a gradation value of a reference plane within the shape image, and the second parameter may define a size of a detection object within the shape image.

According to still another embodiment of the invention, in addition to the above configuration, the reference plane may be specified within the shape image on the basis of a plane having no asperity.

According to still another embodiment of the invention, in addition to the above configuration, the inspection type selected by the inspection type selection unit may include at least any one of an inspection of a flaw on the inspection object, a determination of the presence or absence of the inspection object, optical reading of a character string displayed on the inspection object, the presence or absence of dirt included in the inspection object, the presence or absence of a dent included in the inspection object, and the presence or absence of a streak included in the inspection object.

According to still another embodiment of the invention, in addition to the above configuration, the first parameter may be set by setting the gradation value of the reference plane to a median value in response to a selection of the inspection of a flaw on the inspection object as the inspection type by the inspection type selection unit.

According to still another embodiment of the invention, in addition to the above configuration, the first parameter may be set by setting the gradation value of the reference plane to zero in response to a selection of the determination of the presence or absence of the inspection object as the inspection type by the inspection type selection unit.

According to still another embodiment of the invention, in addition to the above configuration, the first parameter may be set by setting the gradation value of the reference plane to a minimum value in response to a selection of the optical reading of a character string displayed in a projecting shape on the inspection object as the inspection type by the inspection type selection unit.

According to still another embodiment of the invention, in addition to the above configuration, the first parameter may be set by setting the gradation value of the reference plane to a maximum value in response to a selection of the optical reading of a character string displayed in a recessed shape on the inspection object as the inspection type by the inspection type selection unit.

According to still another embodiment of the invention, in addition to the above configuration, the inspection type selection unit may be capable of selecting an inspection of a flaw on the inspection object with respect to a shape image including information relating to shape as the inspection type.

According to still another embodiment of the invention, in addition to the above configuration, the first parameter may be a detection direction of a flaw as the detection object.

According to still another embodiment of the invention, in addition to any of the above configurations, the second parameter may be a characteristic size or a segment size of the inspection object.

According to still another embodiment of the invention, in addition to any of the above configurations, the second parameter may be a size of a flaw as the detection object.

According to still another embodiment of the invention, in addition to any of the above configurations, the image generation unit may change a width or a pitch for the change of the second parameter in generation of the plurality of processed images.

According to still another embodiment of the invention, in addition to any of the above configurations, the image generation unit may change a change width of a contrast of an image of the inspection object on the basis of the inspection type selected by the inspection type selection unit as the second parameter.

According to still another embodiment of the invention, in addition to any of the above configurations, the parameter setting unit may set a value of the second parameter corresponding to the processed image selected by the image selection unit and the set value of the second parameter is displayable on the display unit.

According to still another embodiment of the invention, in addition to the above configuration, the image inspection apparatus may further include a parameter fine adjustment unit for manually adjusting a value of the second parameter set by the parameter setting unit.

According to still another embodiment of the invention, in addition to any of the above configurations, the second parameter candidate list image group displayed as a list on the display unit may be updated and displayed again on the basis of the second parameter adjusted by the parameter fine adjustment unit.

According to still another embodiment of the invention, in addition to any of the above configurations, the image inspection apparatus may further include an image recommendation unit that calculates a predetermined evaluation value for each of the processed images displayed in the second parameter candidate list image group on the display unit and recommends an image that should be selected on the basis of the evaluation value.

According to still another embodiment of the invention, in addition to the above configuration, the evaluation value calculated by the image recommendation unit may be displayable on the display unit.

According to still another embodiment of the invention, in addition to any of the above configurations, a plurality of processed images may be generated by changing a third parameter that is an image processing parameter different from the first parameter and the second parameter with the first parameter and the second parameter set by the parameter setting unit and may be displayed as a list as a third parameter candidate list image group on the display unit.

According to still another embodiment of the invention, in addition to the above configuration, the third parameter may be a parameter for processing for enhancing the detection object.

According to one embodiment of the invention, an image inspection method performs a visual inspection of an inspection object. The image inspection method may include the steps of; receiving a selection of a desired inspection type from a plurality of inspection types previously prepared as candidates for the visual inspection of the inspection object; receiving input of an image of the inspection object, automatically setting a value of a first parameter according to the inspection type selected by the inspection type selection unit among a plurality of image processing parameters relating to image processing performed on the inspection object image, generating a plurality of processed images by changing a value of a second parameter different from the first parameter and performing image processing on the inspection object image with each of the changed second parameter values, displaying the plurality of generated processed images as a list on a display unit, and receiving a selection of any one of the plurality of displayed processed images; and setting a value of the second parameter corresponding to the processed image selected by the image selection unit by the parameter setting unit. This enables a user to select a desired image from the processed images which are obtained on the basis of the plurality of different second parameter candidate values and displayed as a list and to perform image processing using the second parameter candidate value that is set in the selected processed image. Thus, it is possible to obtain an advantage that setting to the second parameter that enables desired image processing to be obtained can be performed on the basis of the obtained processed image without understanding the detailed meaning of the second parameter.

According to one embodiment of the invention, an image inspection program performs a visual inspection of an inspection object. The image inspection program may cause a computer to implement functions of; receiving a selection of a desired inspection type from a plurality of inspection types previously prepared as candidates for the visual inspection of the inspection object; receiving input of an image of the inspection object; automatically setting a value of a first parameter according to the inspection type selected by the inspection type selection unit among a plurality of image processing parameters relating to image processing performed on the inspection object image; generating a plurality of processed images by changing a value of a second parameter different from the first parameter and performing image processing on the inspection object image with each of the changed second parameter values; displaying the plurality of generated processed images as a list on a display unit, and receiving a selection of any one of the plurality of displayed processed images; and setting a value of the second parameter corresponding to the processed image selected by the image selection unit by the parameter setting unit. This configuration enables a user to select a desired image from the processed images which are obtained on the basis of the plurality of different second parameter candidate values and displayed as a list and to perform image processing using the second parameter candidate value that is set in the selected processed image. Thus, it is possible to obtain an advantage that setting to the second parameter that enables desired image processing to be obtained can be performed on the basis of the obtained processed image without understanding the detailed meaning of the second parameter.

According to one embodiment of the invention, a computer-readable recording medium or a storage device stores the above image inspection program. The recording medium includes a magnetic disk, am optical disk, a magneto-optical disk, a semiconductor memory, and other medium that can store the program, such as a CD-ROM, a CD-R, a CD-RW, a flexible disk, a magnetic tape, an MO, a DVD-ROM, a DVD-RAM, a DVD-R, a DVD+R, a DVD-RW, a DVD+RW, a Blu-ray (product name), and a HD DVD (AOD). Further, the program includes one in the form of being distributed by downloading through a network such as the Internet, in addition to one stored in the above recording medium and distributed. Moreover, the storage device includes a general-purpose or dedicated device mounted with the program in the form of software, firmware or the like, in an executable state. Furthermore, each processing and each function included in the program may be executed by program software that is executable by a computer, or processing in each unit may be implemented by predetermined hardware such as a gate array (FPGA, ASIC) or in the form of program software being mixed with a partial hardware module that implements some element of hardware.

BRIEF DESCRIPTION OF THE DRAWINGS

FIG. 4 is an image view illustrating a user interface screen for manually performing parameter setting when an image inspection is performed by a photometric stereo method;

FIG. 5 is an image view illustrating a user interface screen for manually performing parameter setting when a flaw inspection is performed;

DETAILED DESCRIPTION OF PREFERRED EMBODIMENTS

Hereinbelow, embodiments of the present invention will be described with reference to the drawings. However, the embodiments described hereinbelow are examples for embodying the technical idea of the present invention, and the present invention is not limited to the following embodiments. Further, the present specification never limits members described in the claims to members of the embodiments. In particular, sizes, materials, shapes, relative position of components described in the embodiments are not intended to limit the scope of the present invention thereto, but are mere examples unless otherwise specifically described. It is to be noted that sizes and positional relationships of members illustrated in each drawing may be exaggerated for the purpose of clarifying the description. Further, in the following description, identical names or signs designate identical or similar members, and a detailed description thereof will be appropriately omitted. Moreover, elements constituting the present invention may have a mode where a plurality of elements are configured as one member so that the one member serves as the plurality of elements, or conversely, a function of one member may be shared and implemented by a plurality of members.

Figure 1:
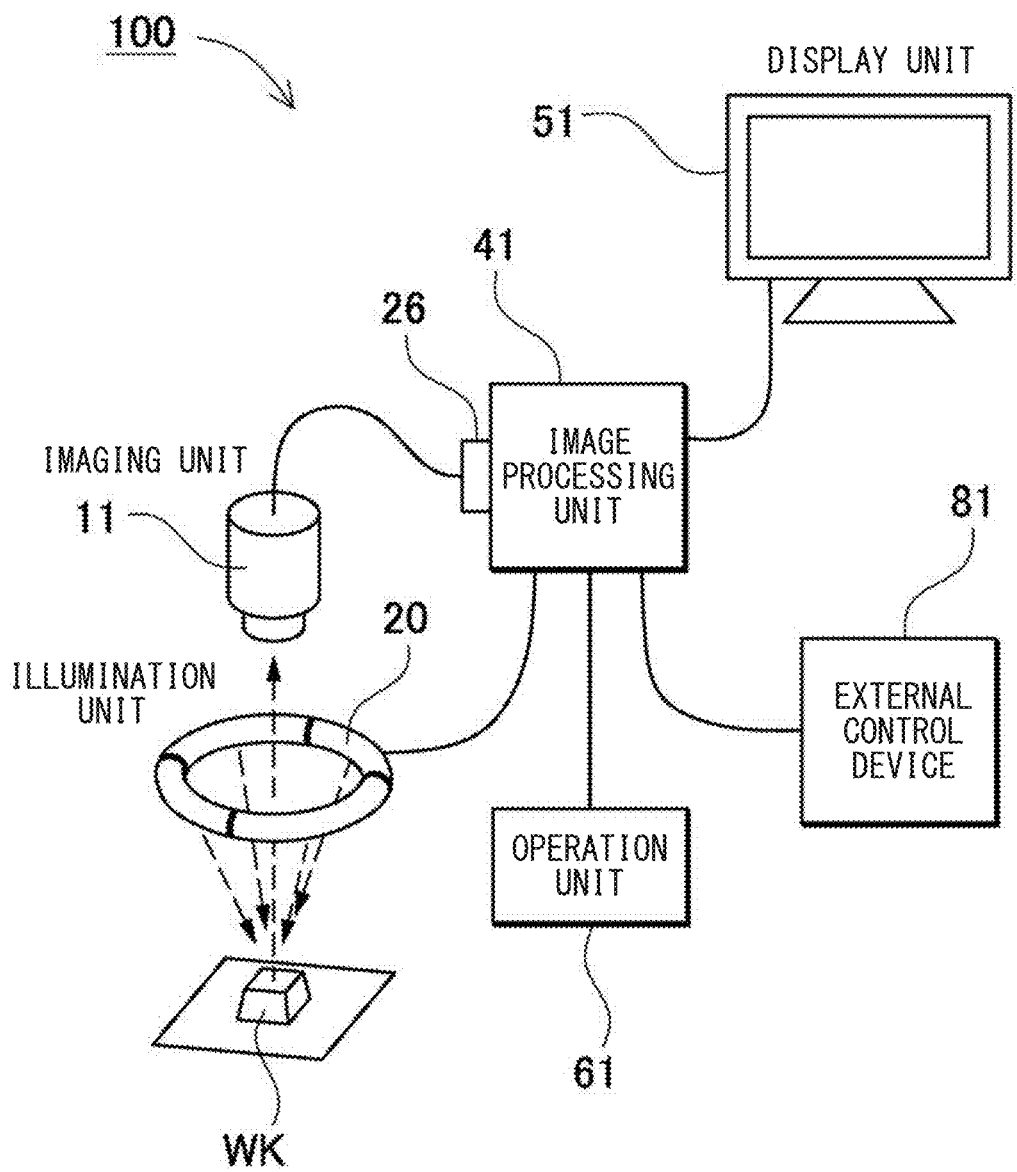
FIG. 1 is a block diagram illustrating an image inspection apparatus according to an embodiment of the present invention.

FIG. 1 illustrates an image inspection apparatus 100 according to an embodiment of the present invention. The image inspection apparatus 100 captures an image of a workpiece WK to be inspected, performs predetermined image processing on the captured image, and performs a predetermined inspection such as a determination of the presence or absence of a flaw on the surface of the workpiece WK or the shape or OCR of a character string formed on the surface. The image inspection apparatus 100 illustrated in FIG. 1 is provided with an imaging unit 11, an illumination unit 20, an image processing unit 41, an operation unit 61, a display unit 51, and an external control device 81.

The illumination unit 20 is a member for applying illumination light to the workpiece WK. The imaging unit 11 is provided with an imaging element for capturing an image of the workpiece WK. The image captured by the imaging unit 11 is selected according to an image processing system. The imaging unit 11 captures an optical image that is used for a desired inspection such as a flaw inspection or OCR, a partial illumination image that is required for image generation by a photometric stereo method, and a fringe projection image that is required for height image generation in triangulation. The operations of the imaging unit 11 and the illumination unit 20 are controlled by the image processing unit 41. The image processing unit 41 is provided with an illumination control unit 26, and synchronizes timing of the application of illumination light by the illumination unit 20 with timing of imaging by the imaging unit 11.

The image processing unit 41 is a member for performing predetermined image processing on an image captured by the imaging unit 11 and further outputting a result of an image inspection. The image processing unit 41 may be configured by dedicated hardware or may be configured by a general-purpose device that includes software installed therein, for example, a general-purpose or dedicated computer that includes an image inspection program installed therein. In the following example, there will be described, as an example, a configuration in which an image inspection program is installed in a dedicated computer that includes hardware such as a graphics board specialized in image inspection processing.

The display unit 51 is a member for displaying an image captured by the imaging unit 11 and used by a user for checking various settings and performing a setting operation as needed. For example, a display such as an LCD, a CRT, or an organic EL panel can be used.

The operation unit 61 is a member for performing various setting operations and input. A keyboard, a mouse, or a console can be used. The display unit 51 and the operation unit 61 may be combined by using a touch panel.

The external control device 81 is a member for executing predetermined output or processing upon reception of a result of the image processing unit 41. For example, an external controlled device such as a sequencer, or a programmable logic controller (PLC) or a computer that controls such an external controlled device corresponds to the external control device 81.

Figure 2:
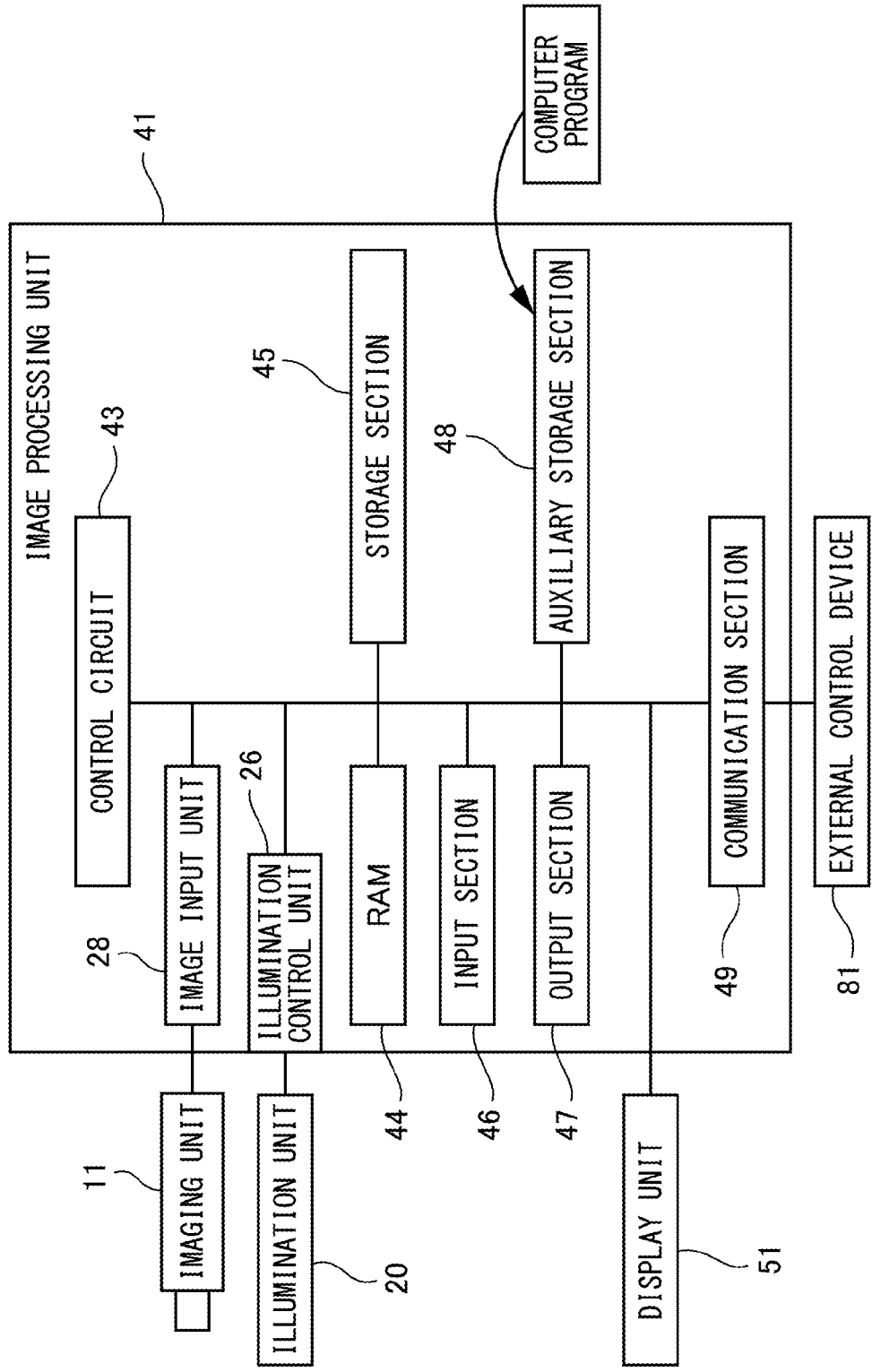
FIG. 2 is a block diagram illustrating an image processing unit of the image inspection apparatus of FIG. 1.

FIG. 2 illustrates an example of a hardware configuration of the image processing unit 41. The image processing unit 41 illustrated in FIG. 2 is connected to the imaging unit 11, the illumination unit 20, and the display unit 51. The display unit 51 is a member for displaying a parameter candidate list image group (described in detail below) in which a plurality of processed images, which are generated by an image generation unit, are listed.

The image processing unit 41 is provided with an image input unit 28, the illumination control unit 26, a control circuit 43, a RAM 44, an input section 46, an output section 47, a communication section 49, a storage section 45, and an auxiliary storage section 48. The image input unit 28 is a member that is connected to the imaging unit 11 for receiving input of an image captured by the imaging unit 11. The illumination control unit 26 is a member that is connected to the illumination unit 20 for controlling an illumination direction and turning-on timing. In the example of FIG. 2, the imaging unit 11 and the illumination unit 20 are configured as separate bodies and connected to the image processing unit 41 through individual cables. Alternatively, the imaging unit and the illumination unit may be integrally configured and connected to the image processing unit 41 through a single cable.

The control circuit 43 is a member for controlling each member and includes a CPU or a MPU. The storage section 45 is a storage element for holding various data, and a hard disk or a semiconductor memory can be used as the storage section 45. The RAM 44 is a memory area that reads necessary data from the storage section 45 and performs a temporary operation. The input section 46 is a member for inputting data from the outside. For example, a standardized or dedicated input interface such as an I/O port, a serial port, or a parallel port can be used as the input section 46. Further, the input section 46 may be a member for input by a user such as a mouse or a keyboard. The output section 47 is an output interface for outputting data of various operation results and a determination result of an image inspection or a captured image and setting to the outside and may also serve as the input section 46. The communication section 49 is a member for performing data communication with an external device connected to the image processing unit 41, for example, the external control device 81.

The auxiliary storage section 48 is an interface into which a portable medium can be removably inserted. For example, a storage medium (e.g., a USB (product name) memory or a SD card (product name)) which stores a computer program or setting data therein is connected to the auxiliary storage section 48, and the data is copied to the storage section 45. Further, setting data or main data may be written to the storage medium.

The computer program and the setting data are not necessarily copied from the storage medium to the storage section 45, and may be read and executed through the auxiliary storage section 48 while being held on the storage medium.

In the example of FIG. 2, an image of the workpiece WK illuminated by the illumination unit 20 is captured by the imaging unit 11, and the image is input from the image input unit 28. However, the present invention is not limited to this configuration, and an image captured by another member or an image that has already been captured and stored may be transferred and input to the image processing unit.

(Image Processing Unit 41)

Figure 3:
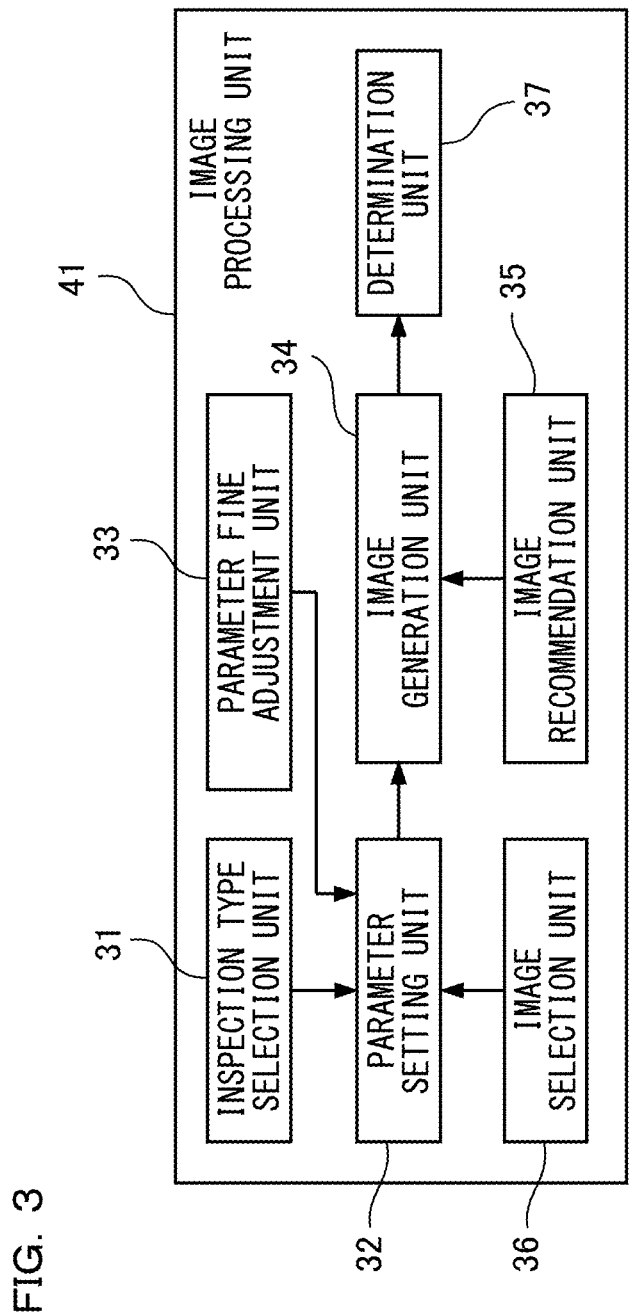
FIG. 3 is a functional block diagram of the image processing unit.

Next, FIG. 3 illustrates a functional block diagram of the image processing unit 41. The image processing unit 41 illustrated in FIG. 3 is provided with an inspection type selection unit 31, a parameter setting unit 32, a parameter fine adjustment unit 33, an image generation unit 34, an image recommendation unit 35, an image selection unit 36, and a determination unit 37.

The inspection type selection unit 31 is a member for receiving a selection of a desired inspection type from a plurality of inspection types which are previously prepared as candidates for a visual inspection of a workpiece. The inspection type is a target visual inspection object. As described below, examples of the inspection type include an inspection of a flaw on a workpiece, a determination of the presence or absence of a workpiece, optical reading of a character string displayed on a workpiece (OCR), the presence or absence of dirt such as a stain included in a workpiece, the presence or absence of a dent included in a workpiece, and the presence or absence of a streak included in a workpiece.

In particular, in the present specification, the visual inspection type includes OCR. A character string to be read by OCR includes a numeric character and a mark.

The parameter setting unit 32 is a member for automatically setting values of a plurality of image processing parameters relating to image processing which is performed on an inspection object image according to the inspection type selected by the inspection type selection unit 31. In this example, the common parameter setting unit 32 sets a plurality of parameters including a first parameter, a second parameter, and a third parameter as the image processing parameters. However, the present invention is not limited to this configuration, and it is needless to say that members that set the respective image processing parameters may be individually provided.

The parameter fine adjustment unit 33 is a member for manually setting a value of an image processing parameter set by the parameter setting unit 32. The enables a user to further set the value of the automatically-set image processing parameter by selection in the image selection unit 36. Accordingly, it is possible to obtain an advantage that fine adjustment to obtain a more desired image can be relatively easily performed without understanding the meaning of the image processing parameter. The parameter candidate list image group which is displayed as a list by the display unit 51 can be updated and displayed again on the basis of the image processing parameter adjusted by the parameter fine adjustment unit 33. Accordingly, the candidate image group can be updated and displayed again with the finely-adjusted second parameter. Thus, a user can visually check a change in the image after the fine adjustment which is performed by himself or herself, which results in easier selection of a desired image.

The image selection unit 36 is a member for receiving a selection of any one of a plurality of processed images which are included in a second parameter candidate list image group displayed on the display unit 51.

The image recommendation unit 35 is a member for calculating a predetermined evaluation value with respect to each of the processed images displayed in the parameter candidate list image group of the display unit 51 and recommending an image that should be selected on the basis of the evaluation value. Guidance can be given in a selection by a user by recommending an image that should be selected on the basis of an image analysis result. For example, an image contrast value is employed as the evaluation value. Further, an evaluation value calculated by the image recommendation unit 35 can also be displayed on the display unit 51. Displaying a score that assists the selection of an image in this manner can contribute to the selection by a user.

(Determination Unit 37)

The determination unit 37 determines the presence or absence of a flaw on the surface of the workpiece WK on the basis of the processing result. That is, a parameter candidate value corresponding to the processed image selected by the image selection unit 36 is set as a parameter by the parameter setting unit 32, and an image inspection is performed on the processed image generated by the image generation unit 34. The function of the determination unit 37 is implemented by the image processing unit. The determination unit 37 performs an inspection of the presence or absence of a flaw or the size of a flaw on the basis of an obtained texture extraction image or a height image. For example, the presence of a flaw is determined when a value is equal to or higher than a predetermined threshold. Further, the determination unit 37 can also perform OCR as needed on the basis of a contour extraction image and output a recognized character string.

(Image Generation Unit 34)

The image generation unit 34 is a member for generating a plurality of processed images by changing different image processing values to a plurality of candidate values and performing image processing on an inspection object image with each of the changed parameter candidate values. An image processing parameter is determined by allowing a user to select a desired processed image from the plurality of obtained processed image as candidates, and an image to be an image inspection object is generated on the basis of the determined image processing parameter. For example, a shape image having information relating to shape can be used as the image to be an image inspection object.

The image generation unit 34 generates an image by various algorithms. For example, image inspection processing, for example, OCR is performed using images generated by the photometric stereo method, for example, a shape image such as a contour extraction image having a pixel value corresponding to the shape and a texture extraction image (albedo). Alternatively, a flaw inspection may be performed on an optical image. Here, first, an example in which a shape image is generated in accordance with the photometric stereo method and an image inspection is performed thereon will be described as a first embodiment.

First Embodiment: Image Inspection Based on Photometric Stereo Method

In the photometric stereo method, in order to obtain the three-dimensional shape of a workpiece, light is applied to an unknown surface of the workpiece from various directions, and the shape of the workpiece is estimated using a difference in reflected light from the workpiece. The reflected light from the workpiece is affected by an incident angle of illumination light and a distance from an illuminator and has a property that the reflected light becomes brightest with an incident angle of 90° and becomes darker as the distance from an illuminator increases. With this property, a plurality of illuminators whose brightness and positions are known are prepared and turning-on of the illuminators is sequentially switched to estimate an orientation of the surface using a difference in brightness of the reflected light when light is applied from the illuminator in each direction. Specifically, an X-component image and a Y-component image are created by replacing an X component and a Y component of the inclination image with the luminance of the X component and the luminance of the Y component, and applied to an inspection.

Figure 10:
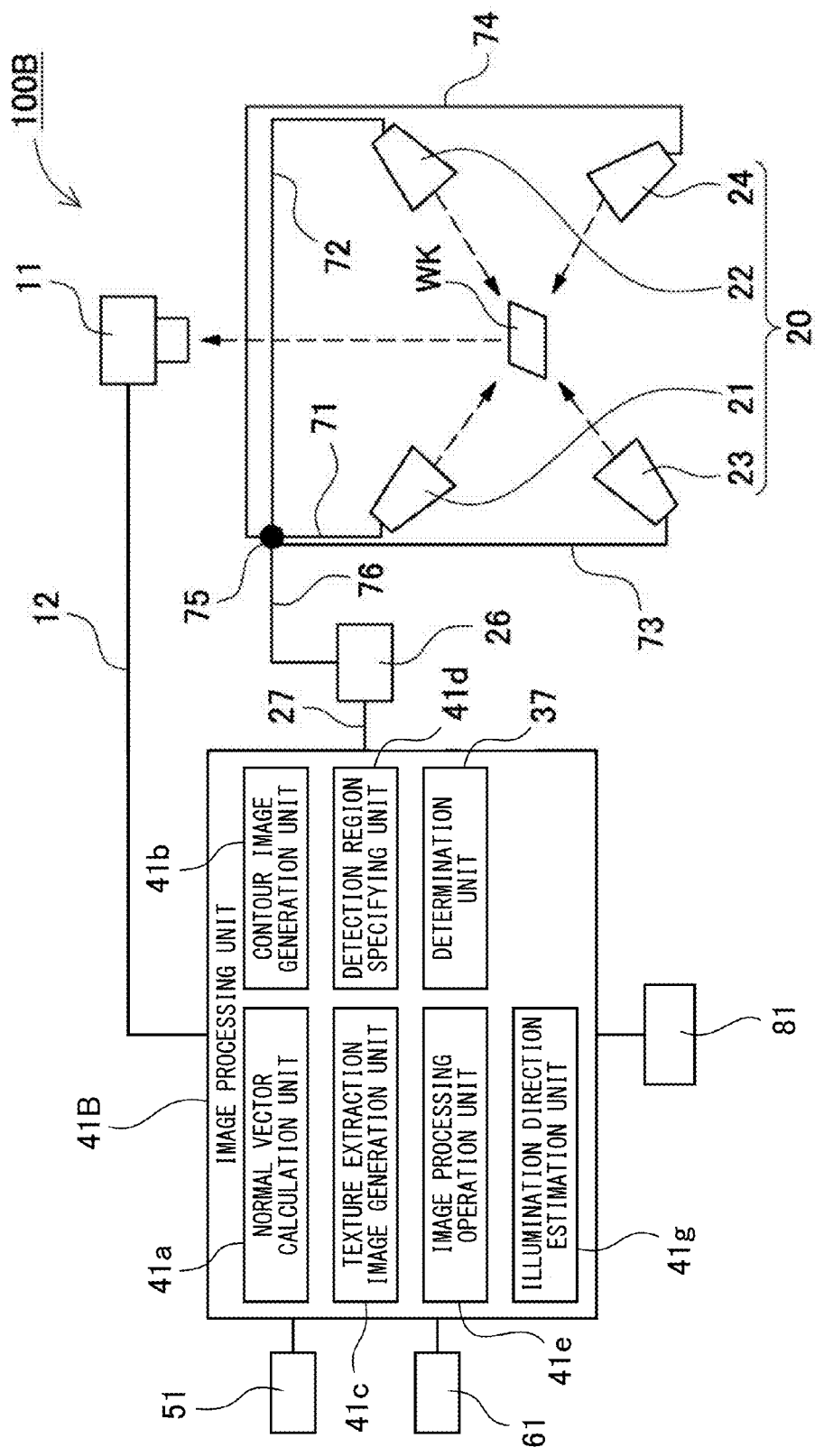
FIG. 10 is a block diagram illustrating an image inspection apparatus that performs an image inspection by the photometric stereo method.

FIG. 10 is a block diagram illustrating an image inspection apparatus that performs an image inspection by the photometric stereo method. The image inspection apparatus 100B illustrated in FIG. 10 is provided with an imaging unit 11 which captures an image of a workpiece WK from a certain direction, an illumination unit 20 for illuminating the workpiece WK from three or more different illumination directions, an illumination control unit 26 for turning on illumination units one by one in a turning-on order, and an image processing unit 41B which is connected to the illumination control unit 26 and the imaging unit 11 to control these units. The image processing unit 41B and the imaging unit 11 are connected through an imaging cable 12, and the image processing unit 41B and the illumination control unit 26 are connected through an illumination cable 27. Further, the image processing unit 41B connects the display unit 51 and the operation unit 61. Furthermore, the image processing unit 41B may also be connected to an external device such as a programmable logic controller (PLC) or a computer as needed.

The imaging unit 11 captures an image of the workpiece WK from a certain direction at illumination timing of turning on each of the illumination units by the illumination control unit 26 to capture a plurality of partial illumination images with different illumination directions.

The image processing unit 41B functions as a source image generation section for generating a source image of the surface of the workpiece WK in an assumed illumination direction, which is obtained by assuming an illumination direction, using a pixel value of each of the pixels having the corresponding relationship between the plurality of partial illumination images captured by the imaging unit 11 on the basis of the photometric stereo method, in each of a plurality of different assumed illumination directions. Specifically, the source image generation section implements functions of a normal vector calculation unit 41a, a contour image generation unit 41b, a texture extraction image generation unit 41c, an inspection region specifying unit 41d, an image processing section operation unit 41e, the determination unit 37, and an illumination direction estimation unit 41g. The normal vector calculation unit 41a calculates a normal vector n with respect to the surface of the workpiece WK at each of pixels using a pixel value of each of pixels having a corresponding relationship between the plurality of partial illumination images captured by the imaging unit 11. The contour image generation unit 41b performs differential processing in an X direction and a Y direction on the calculated normal vector n at each of the pixels to generate a contour image that represents the contour of an inclination of the surface of the workpiece WK. The texture extraction image generation unit 41c calculates an albedo of each of the pixels from the calculated normal vector n at the corresponding pixel, the number of the calculated normal vectors n being the same as the number of times of illumination performed by the illumination unit, and generates a texture extraction image that represents a pattern obtained by eliminating the influence of an inclination of the surface of the workpiece WK from the albedos. The inspection region specifying unit 41d specifies the position of an inspection region to be inspected with respect to the generated contour image. The image processing section operation unit 41e performs image processing for detecting a flaw within the specified inspection region. The determination unit 37 determines the presence or absence of a flaw on the surface of the workpiece WK on the basis of a result of the processing. The illumination direction estimation unit 41g detects an illumination direction that has the highest consistency with an actual illumination direction in the illumination unit from a plurality of source images SP (described below) based on a plurality of images generated by the source image generation section.

The imaging unit 11 and the illumination unit 20 can be disposed as separate members. This enables the layout to have a high flexibility. As an example, as illustrated in a schematic plan view of FIG. 11 and a schematic side view of FIG. 12, the imaging unit 11 with its optical axis aligned with a vertical direction is disposed immediately above the workpiece WK which is placed on a stage SG. Further, four illumination units, specifically, a first illumination unit 21, a second illumination unit 22, a third illumination unit 23, and a fourth illumination unit 24 are disposed at the same height in the four cardinal directions of north, south, east, and west of the imaging unit 11. The positional relationship between the disposed imaging unit 11 and each of the disposed illumination units is recorded in the image inspection apparatus 100B. The illumination control unit 26 sequentially turns on the illumination units at predetermined illumination timing, and the common imaging unit 11 captures an image of the workpiece WK from a certain direction to acquire a partial illumination image.

It is to be noted that the configuration of the imaging unit 11 and the illumination unit is not limited to the configuration in which these units are separate members, and these units may be integrally configured through an arm or the like. In this case, since the positional relationship between the imaging unit and the illumination unit is fixed in advance, an adjustment operation such as aligning the optical axes can be eliminated. However, the flexibility is lost.

(Imaging Unit 11)

For example, an imaging element such as a charge coupled device (CCD) camera or a complementary metal oxide semiconductor (CMOS) imager can be used as the imaging unit 11. The imaging element photoelectrically converts an image of a subject and outputs an image signal, and a signal processing block converts the output image signal to a luminance signal and a color difference signal and outputs the signals to the image processing unit 41B connected through the imaging cable 12.

(Illumination Unit)

Figure 11:
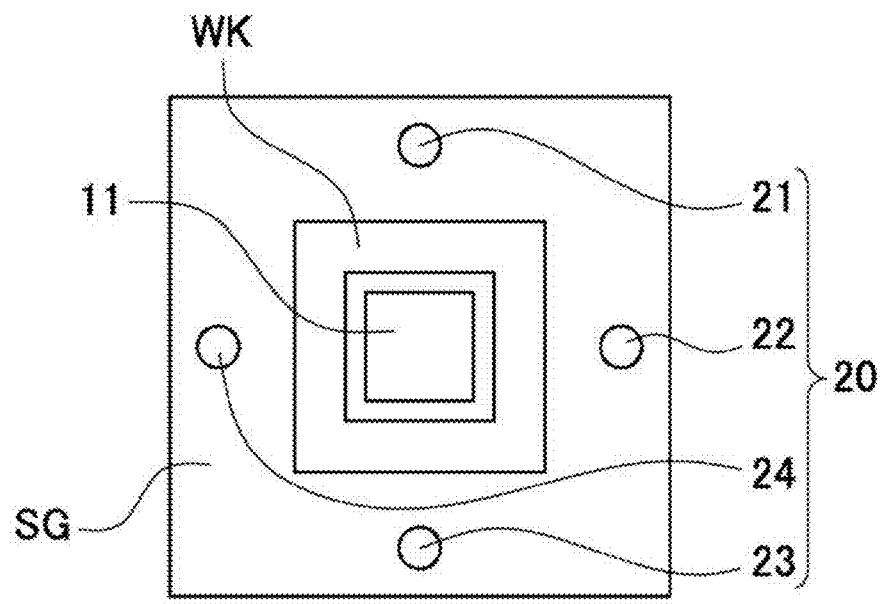
FIG. 11 is a schematic plan view illustrating the positional relationship between an imaging unit and an illumination unit of the image inspection apparatus of FIG. 10.

The first illumination unit 21, the second illumination unit 22, the third illumination unit 23, and the fourth illumination unit 24 which are illumination elements constituting the illumination unit 20 are arranged so as to surround the workpiece WK as illustrated in the schematic plan view of FIG. 11 so that illumination light can be applied to the workpiece WK from different illumination directions. Further, as illustrated in the schematic side view of FIG. 12, each of the illumination units is installed with its optical axis facing obliquely downward.

It is preferred that the optical axis of the imaging unit be aligned with a central axis of a plane (virtual rotation plane) where the illumination units are arranged so that the common imaging unit can capture an image of the workpiece WK illuminated by each of the illumination units. Further, it is preferred that the illumination units be equally spaced at an angle (azimuth from the central axis) that is obtained by equally dividing 360° by the number of illumination units. Furthermore, the zenith angle is preferably constant in all the illumination units. Furthermore, the distance between each of the illumination units and the workpiece WK is preferably constant. This makes it possible to simplify input of information of the azimuth and the zenith angle which is required for an operation in photometric stereo processing. As described below, an all-lit image MC is captured in an all-lit state in which all the illumination units are ON. Thus, an image can be captured in an illumination state with less unevenness merely by equally reducing the intensity of all the illumination units with the above configuration.

In the example of FIG. 10, the illumination unit 20 includes the four illumination units: the first illumination unit 21, the second illumination unit 22, the third illumination unit 23, and the fourth illumination unit 24. An incandescent lamp, a fluorescent lamp or the like can be used as each of the illumination units. In particular, a semiconductor light emitting element such as a light emitting diode (LED) is preferred because of its low power consumption, long life, and excellent responsivity. As illustrated in FIG. 10, the illumination units are connected to an illumination branch unit 75 through cables 71, 72, 73, 74 which correspond to the respective illumination units, and further connected to the illumination control unit 26 through a cable 76. The illumination branch unit is an interface for connecting each of the illumination units to the illumination control unit 26. Specifically, an illumination connector for connecting the illumination cable 27 which extends from the illumination unit is provided. Correctly connecting an illumination cable of each of the illumination units to the illumination connector of the illumination branch unit enables the illumination control unit 26 to turn on each of the illumination units from a correct direction in a correct order. Further, the partial illumination image can be captured by operating the imaging unit synchronously with each illumination timing. In the example of FIG. 10, the illumination branch unit is provided separately from the illumination control unit 26. However, the illumination branch unit is not limited to this configuration, and, for example, the illumination branch unit may be incorporated in the illumination control unit.

An illumination color of the illumination units 21, 22, 23, 24 can also be changed in accordance with the type of the workpiece WK. For example, when a fine flaw is inspected, blue having a short wavelength is preferred. When a colored workpiece is inspected, white illumination is preferably used so that the color of illumination is not obstructive. Further, when oil is adhered to a workpiece, red illumination is preferably used so as to prevent the influence of the oil.

Figure 12:
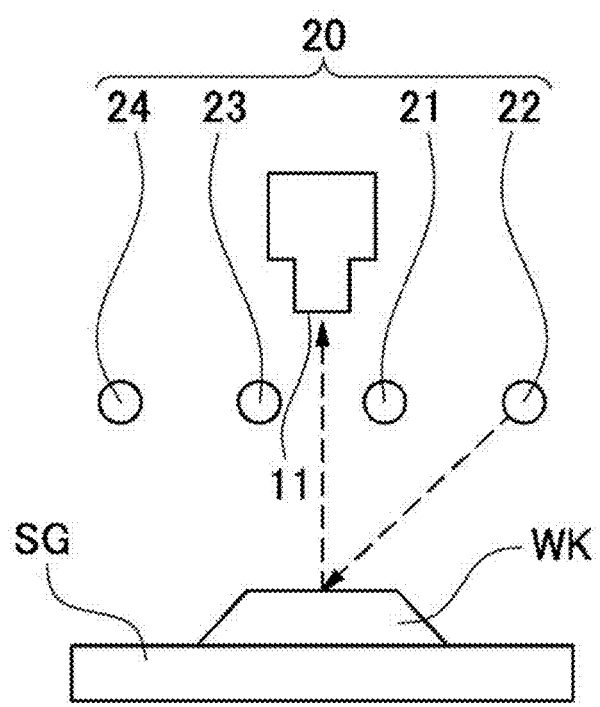
FIG. 12 is a schematic side view illustrating the positional relationship between the imaging unit and the illumination unit of the image inspection apparatus of FIG. 10.

Although the four illumination units are used in the example of FIGS. 10 to 12, it is sufficient to use at least three illumination units so as to illuminate the workpiece WK from three or more different illumination directions. When the number of illumination units is increased, the partial illumination images can be obtained from a larger number of illumination directions. Thus, the accuracy of an image inspection can be improved. For example, eight illumination units in total additionally including the northeast, northwest, southeast, and southwest directions may be arranged. Further, it is preferred that the illumination units be equally spaced at an angle (azimuth from the central axis) that is obtained by equally dividing 360° by the number of illumination units. Further, the zenith angle is preferably constant in all the illumination units. It is to be noted that an increase in the number of images that should be processed leads to an increase in the processing amount, which slows the processing time. In the present embodiment, the four illumination units are used as described above taking into consideration a balance between the processing speed, the easiness of operation processing, and the accuracy.

Further, the illumination unit may include a plurality of light emitting elements which are annularly arranged. For example, the illumination unit may be a ring illuminator including light emitting elements which are annularly arranged and divided into four illumination blocks. In this case, a first illumination block, a second illumination block, a third illumination block, and a fourth illumination block are defined as the first illumination unit, the second illumination unit, the third illumination unit, and the fourth illumination unit, respectively, and illumination timings of the respective illumination blocks are made different from each other by the illumination control unit. Accordingly, control can be performed similarly to the case where four separate illumination units are present.

In the present embodiment, the processing is performed on the precondition that partial illumination light by each of the illumination units is parallel light within an imaging range. As long as the partial illumination light is parallel light, only the direction of the illumination light (e.g., any of the north, south, east and west directions) should be taken into consideration, and it is not necessary to take into consideration a detailed position, for example, a coordinate position of a light source of the illumination unit.
(Illumination Control Unit 26)

The illumination control unit 26 turns on three or more illumination units one by one in the turning-on order and synchronously controls each of the illumination units and the imaging unit 11 so that the imaging unit 11 captures an image of the workpiece WK from a certain direction at the illuminating timing of turning on each of the illumination units. In other words, the illumination control unit 26 synchronizes the timing of illumination by the illumination unit with the timing of imaging by the imaging unit 11. Further, the turning-on order in which the illumination control unit 26 turns on the illumination units may be configured such that illumination units which surround the workpiece are turned on in a clockwise order or a counterclockwise order, or in a discrete order such as an alternate order or an intersecting order. Regardless of the order, it is possible to construct a normal vector image on the basis of the photometric stereo method by grasping an illumination direction of the illuminator with which a partial illumination image has been captured at each illumination timing.

Although, in the first embodiment of FIG. 10, the illumination control unit 26 is provided separately from the image processing unit 41B, the illumination control unit 26 is not limited to this configuration. For example, the illumination control unit may be integrated with the image processing unit or may be incorporated in the illumination unit.
(Image Processing Unit 41B)

The image processing unit 41B controls the operations of the imaging unit 11 and the illumination units 21, 22, 23, 24. Further, by using image signals Q1 to Q4 of four partial illumination images input from the imaging unit 11, the image processing unit 41B generates a normal vector image (hereinbelow, referred to as an "inclination image") on a plane at each pixel, and creates a secondary inclination image (hereinbelow, referred to as a "contour extraction image") in the X direction and the Y direction of the inclination image and a albedo (which means reflectivity) image (hereinbelow, referred to as a "texture extraction image"). Then, the image processing unit 41B performs processing for a flaw inspection or character detection using these images.

It is to be noted that the processing for a flaw inspection or character detection is not necessarily performed by the image processing unit 41B and may be executed by, for example, an external device such as the PLC 81.
(Basic Principle of Photometric Stereo Method)

Figure 13A:
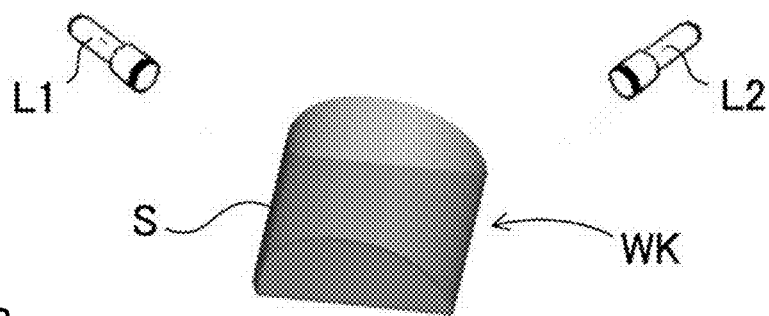
FIG. 13A is a view illustrating the positional relationship between a diffuse reflection surface S and an illuminator.

Here, the basic principle of the photometric stereo method will be described with reference to FIGS. 13A to 13D. First, as illustrated in FIG. 13A, there is assumed a case in which there are an unknown diffuse reflection surface S and a plurality of illuminators (two illumination units including a first illumination unit L1 and a second illumination unit L2 in this example) whose brightness and positions are known. For example, as illustrated in FIG. 13B, when light is applied from the first illumination unit L1, diffused reflected light on the surface of the diffuse reflection surface S is determined only by parameters of (1) the brightness of the illuminator (known), (2) the orientation of the illuminator (known), (3) the orientation of the surface of the workpiece WK (normal vector n), and (4) the albedo of the surface of the workpiece WK.

Figure 13B:
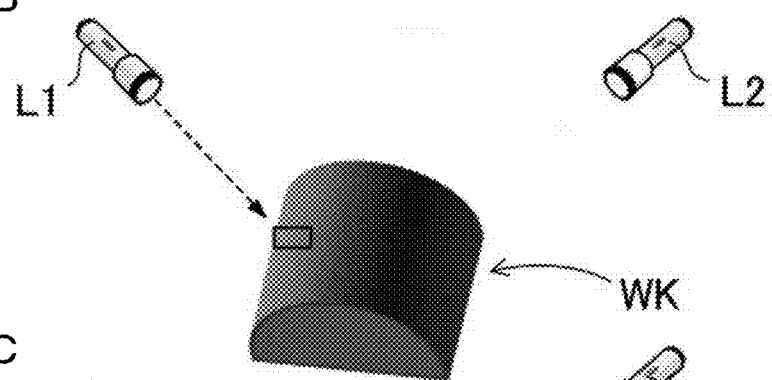
FIG. 13B is a view illustrating a state in which light is applied from L1.
Figure 13C:
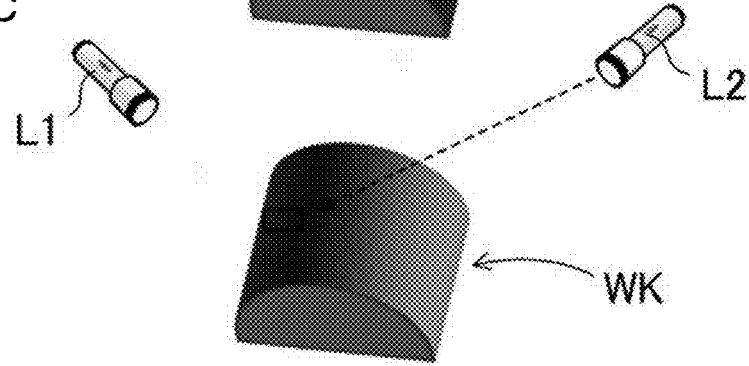
FIG. 13C is a view illustrating a state in which light is applied from L2.
Figure 13D:
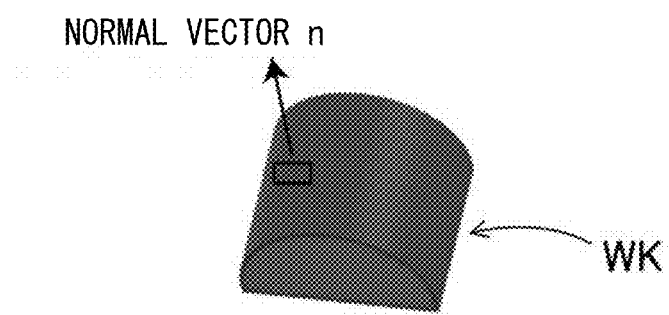
FIG. 13D is a view for describing that an orientation of the surface is estimated from a combination of an illumination direction and the brightness of reflected light, each for describing the basic principle of the photometric stereo method.

Thus, as illustrated in FIGS. 13B and 13C, each of partial illumination images formed by diffused reflected light when illumination light is applied from each of a plurality of different illumination directions, specifically, three or more illumination directions is captured by the imaging unit. Then, as illustrated in FIG. 13D, (3) the orientation of the surface of the workpiece WK (normal vector n) and (4) the albedo of the surface of the workpiece WK, which are unknown, can be calculated from the following relational expression by employing three or more partial illumination images as input images.

$I = \rho L S n$

In the above expression, $\rho$ denotes the albedo, L denotes the brightness of the illuminator, S denotes an illumination direction matrix, n denotes the normal vector of the surface, and I denotes a gradation value of the image.

From the above expression, when there are three illumination units, the following expression is given.

$$\begin{pmatrix} I_1 \\ I_2 \\ I_3 \end{pmatrix} = \rho L \begin{pmatrix} s_{11} & s_{12} & s_{13} \\ s_{21} & s_{22} & s_{23} \\ s_{31} & s_{32} & s_{33} \end{pmatrix} \begin{pmatrix} n_x \\ n_y \\ n_z \end{pmatrix}$$

Further, when there are four illumination units, the following expression is given.

$$\begin{pmatrix} I_1 \\ I_2 \\ I_3 \\ I_4 \end{pmatrix} = \rho L \begin{pmatrix} s_{11} & s_{12} & s_{13} \\ s_{21} & s_{22} & s_{23} \\ s_{31} & s_{32} & s_{33} \\ s_{41} & s_{42} & s_{43} \end{pmatrix} \begin{pmatrix} n_x \\ n_y \\ n_z \end{pmatrix}$$

(Normal Vector n)

From the above expression, the normal vector n can be represented by the following expression.

$n = 1/\rho L \cdot S^+ n$

In the above expression, when $S^+$ is a square matrix, a normal inverse matrix $S^+$: an inverse matrix of a longitudinal matrix is obtained by Moore-Penrose pseudo inverse matrix $S^+ n = (S'S)^{-1} S'$.
(Albedo)

Further, the albedo p can be presented by the following expression.

$\rho = |I|/|LSn|$ (2-2. Contour Extraction Image)

Next, a method for generating an inclination image by the photometric stereo method and obtaining surface information of a workpiece such as a flaw and a contour from the obtained inclination image will be described.
(Inclination Image)

First, a method for generating the inclination image will be described. When a curved surface of a workpiece is denoted by S, the inclination image is represented by the following expression.

$x$ direction:$\delta s/\delta x$, $y$ direction:$\delta s/\delta y$

Figure 14A:
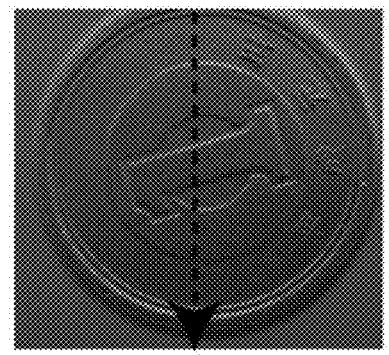
FIG. 14A is a view illustrating an example of an inclination image differentiated in the vertical direction.
Figure 14B:
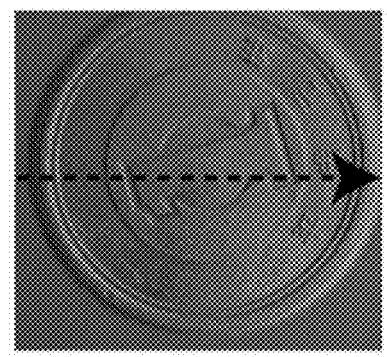
FIG. 14B is a view illustrating an example of an inclination image differentiated in the horizontal direction.

FIGS. 14A and 14B illustrate an example in which a one-yen coin is used as a workpiece as an example of the inclination image. FIG. 14A is a Y-coordinate component image in the normal direction. FIG. 14B is an X-coordinate component image in the normal direction. Here, by using partial illumination images captured from four illumination directions, an inclination image illustrated in FIG. 14A is obtained by performing differentiation in the Y direction (the vertical direction in the drawing), and an inclination image illustrated in FIG. 14B is obtained by performing differentiation in the X direction (the horizontal direction in the drawing).

Here, since the inclination of the surface of the workpieces varies in a flaw and a contour, the inclination images are differentiated in the respective directions. The secondary inclination images are represented by the following expression.

$$x\ \text{direction}: \delta^2 s/\delta x^2, y\ \text{direction}: \delta^2 s/\delta y^2$$

(Contour Extraction Image)

From the above, the portions $\delta^2 s/\delta x^2$, $\delta^2 s/\delta y^2$ of the inclination images in the x direction and the y direction are combined to generate a contour extraction image including information of the contour and a flaw of the workpiece. A contour extraction image E is represented by the following expression.

$$E = \delta^2 s/\delta x^2 + \delta^2 s/\delta y^2$$

Figure 14C:
FIG. 14C is a view illustrating an example of a contour extraction image, each for describing a method for generating the contour extraction image.

In the above expression, E denotes the contour information, and S denotes the curved surface of the workpiece. FIG. 14C illustrates an example of the contour extraction image calculated from FIGS. 14A and 14B. In the contour extraction image, the height is represented by gradation (brightness) of the image in such a manner that a high portion is colored in white and a low portion is colored in black.

(Differentiation Composition Method)

Examples of a differentiation composition method which is performed in the generation of the contour extraction image as described above include: (1) simple addition; (2) multi-resolution; and (3) sum of squares.

(1: Simple Addition)

Here, the simple addition of (1) is the sum of differentials of X, Y inclination images at each pixel.

(2: Multi-Resolution)

Further, in the multi-resolution of (2), a plurality of reduced inclination images are created by reducing the inclination image at different reduction ratios, and the intensity of the contour is obtained in each of the reduced inclination images by the method of (1). The reduction ratios are, for example, 1/1, 1/2, 1/4, 1/8, 1/16, and 1/32. Predetermined weighting and enlargement processing are performed on the plurality of reduced contour images obtained in this manner, and all the enlarged reduced contour images are added to form the contour extraction image. It is possible to extract a flaw or a contour having any thickness by changing the weighting at this time.

(3: Sum of Squares)

Further, in the sum of squares of (3), a contour extraction image in which the sum of squares of differentials of the X, Y inclination images is defined as the intensity of the contour is created. In the present embodiment, the multi-resolution of (2) is employed.

A size of a flaw determined as a flaw varies depending on purposes of a user. For example, a recess extending over 10 pixels may be determined as a flaw, or a recess extending over 100 pixels may be determined as a flaw. Further, it may be desired that only a steep edge be extracted as an edge. When the number of pixels of the inclination image is large, a flaw is regarded as a large flaw in the processing.

Thus, when it is desired to extract a large flaw, an inclination image is reduced, and then enlarged after obtaining the intensity of the contour by the method of (1). On the other hand, when it is desired to extract a small flaw, the differentiation composition may be performed by the method of (1) without performing weighting.

That is, in the weighting, a previously determined weight set is prepared at the time of composition, and all the above types of reduced inclination images are created. When it is desired to see a large flaw, a result from a more reduced image is weighted. On the other hand, when it is desired to see a small flaw, a result from a less reduced image is weighted.

The contour extraction image is obtained by adding all the reduced contour images which have been enlarged because of the following reason. A flaw is typically detected across a plurality of frequencies. Thus, for example, when limited to one frequency, only a flaw that is detected at the limited frequency is extracted, which causes blurriness as a whole.

(Characteristic Size)

The above weight set is determined in such a manner that, for example, a characteristic size is provided as a parameter, and the finest flaw can be detected when a value of the characteristic size is 1, and a larger flaw can be detected as the value increases. The characteristic size is a parameter for setting the size of a flaw or a character to be detected according to each inspection type. When the characteristic size is increased to bring a state in which a larger flaw is easily detected, asperities on the surface of the workpiece become clearer. Thus, a predetermined threshold may be set for the characteristic size, and a case where the characteristic size becomes equal to or larger than the threshold is defined as an asperity mode which may be used separately from a contour extraction mode depending on the characteristic size of the contour extraction image.

Next, a method for calculating $\delta^2 s/\delta x^2$ and $\delta^2 s/\delta y^2$ will be described. Examples of the calculation method include (1) forward difference and (2) central difference.

(1: Forward Difference)

In the forward difference, an inclination image Gh in the horizontal direction and an inclination image Gv in the vertical direction are regarded as input, and a pixel G (x, y) at coordinates (x, y) of a contour image E is calculated by the following expression.

$$E(x,y) = Gh(x-1,y) - Gh(x,y) + Gv(x,y-1) - Gv(x,y)$$

Figure 15A:
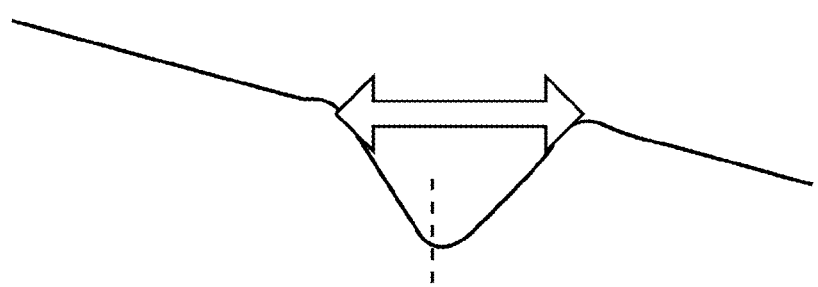
FIG. 15A is a view illustrating surface information.
Figure 15B:
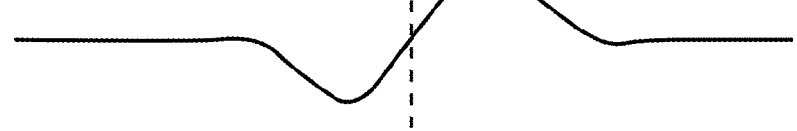
FIG. 15B is a view illustrating an inclination image.
Figure 15C:
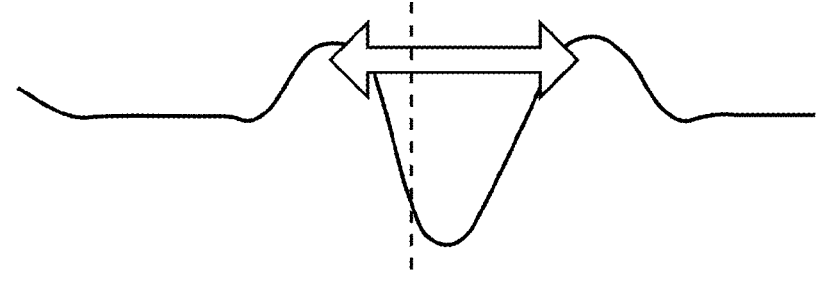
FIG. 15C is a view illustrating a forward difference.
Figure 15D:
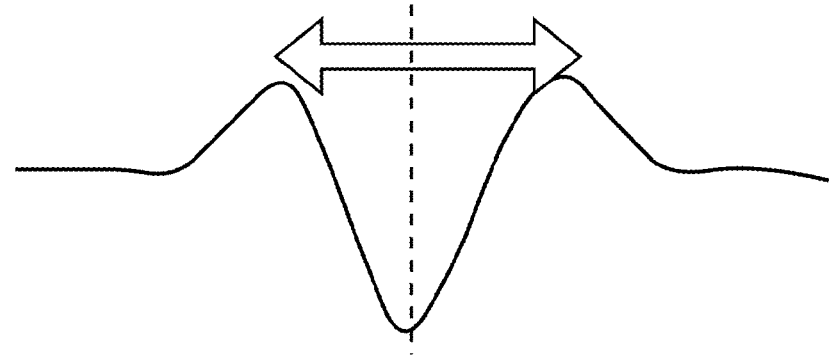
FIG. 15D is a view illustrating a central difference, each for describing a method for calculating $\delta^2 s/\delta x^2$ and $\delta^2 s/\delta y^2$.

FIGS. 15A to 15D illustrate information of a flaw that appears in a contour image as schematic profiles. In these drawings, FIG. 15A illustrates a profile of surface information of a workpiece, FIG. 15B illustrates a profile of an inclination image, FIG. 15C illustrates a profile of a contour image by the forward difference, and FIG. 15D illustrates a profile of a contour image by the central difference. As illustrated in FIGS. 15A and 15C, the forward difference of (1) has an advantage that a flaw in units of one pixel unit is clearly visible. On the other hand, there is also a disadvantage that an image displaced by 0.5 pixels from the original image is obtained.

(2: Central Difference)

Next, a method for calculating $\delta^2 s/\delta x^2$, $\delta^2 s/\delta y^2$ by the central difference will be described. An inclination image Gh in the horizontal direction and an inclination image Gv in the vertical direction are regarded as input, and a pixel G (x, y) at coordinates (x, y) of a contour image E is calculated by the following expression.

$$E(x,y) = Gh(x-1,y) - Gh(x+1,y) + Gv(x,y-1) - Gv(x,y+1)$$

As illustrated in FIGS. 15A and 15D, the central difference of (2) has an advantage that the coordinates are not displaced from the original image, but, on the other hand, has a disadvantage that a result slightly blurs.

(2-3. Texture Extraction Image)

Next, a method for obtaining a texture extraction image preferable for detection of a character by removing a surface state of a workpiece from an inclination image obtained by the photometric stereo method will be described. First, texture information is calculated from the albedo p of the surface of the workpiece. The albedo $\rho$ is represented by the following expression.

$$\rho = |I|/|LSn|$$

In the above expression, $\rho$ denotes the albedo, L denotes the brightness of the illuminator, S denotes an illumination direction matrix, n denotes the normal vector on the surface, and I denotes a gradation value of the image.

It is to be noted that, while it is possible to obtain one texture extraction image (albedo) by the above expression: $\rho=|I|/|LSn|$, it is also possible to obtain N texture extraction images (albedos) from the normal vector obtained from the above expression and N input images (partial illumination images), and combine the texture extraction images to obtain one texture extraction image (albedo). Examples of a specific composition method include an average method and a halation removing method.

Figure 16A:
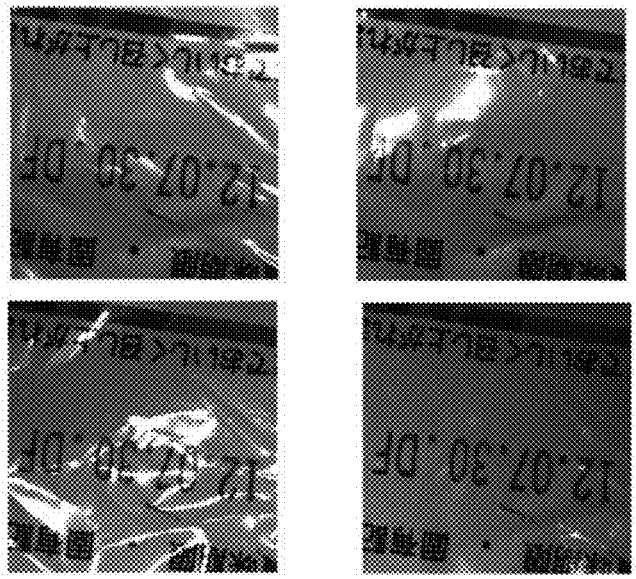
FIG. 16A is a view illustrating source images.
Figure 16B:
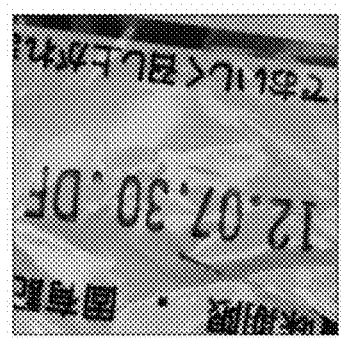
FIG. 16B is a view illustrating an image subjected to processing by an average method.
Figure 16C:
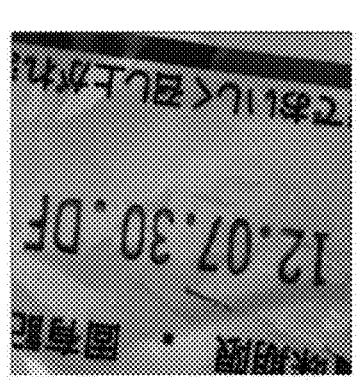
FIG. 16C is a view illustrating an image subjected to processing by a halation removing method, each for describing a method for generating a texture extraction image.

FIGS. 16A to 16C illustrate examples of the texture extraction image. In these drawings, FIG. 16A illustrates four texture extraction images as input images, FIG. 16B illustrates a texture extraction image obtained by applying the average method to these images, and FIG. 16C illustrates a texture extraction image obtained by applying the halation removing method to these images.

(1: Average Method)

In the average method, at each pixel, an average value of N albedos p is defined as a pixel value of the pixel. As illustrated in FIG. 16B, although the shadow is eliminated as a whole, the shadow in a portion having halation in the input image cannot be eliminated by the photometric stereo method. Thus, the influence of halation remains in the image. That is, halation has occurred in white places in the four input images (partial illumination images) of FIG. 16A. When averaging is performed by the average method, although asperities are removed to some extent and characters in the image become easier to read, some asperities remain on a base as illustrated in FIG. 16B.

(2: Halation Removing Method)

Because of a limitation on a dynamic range of the camera as the imaging unit and the variety in the reflectivity of the surface of the workpiece, the above expression: $\rho=|I|/|LSn|$ itself exceeds its adaptive range. Thus, $\rho$ includes an error. The halation removing method can be used to correct the error.

A place where halation occurs is determined by the position of an illuminator. Thus, it is considered that halation basically does not occur in the same place in the four partial illumination images. Strictly speaking, although halation may occur across two places between two directions, it can be said that halation basically occurs in the same place only when two illuminators are used.

In the halation removing method, in combining illumination direction-classified texture extraction images calculated from N partial illumination images, considering that there is much halation in a partial illumination image having the highest pixel value at each pixel or in partial illumination images having the first to Nth highest pixel values, the composition is performed after removing these images.

Specifically, in the present embodiment, for each pixel in the four illumination direction-classified texture extraction images, when the third highest pixel values (e.g., albedo or luminance values) are employed and combined, an image as illustrated in FIG. 16C is obtained, and the influence of halation can be removed. When the fourth highest pixel value is employed, a slightly dark image is obtained due to the influence of a shadow. One the other hand, when the second highest pixel value is employed, the influence of halation is slightly left.

Further, illumination units are provided in eight directions, the fifth highest pixel value is employed on the assumption that no influence of halation is exerted on the fifth highest pixel value or the following highest pixel value. According to an examination performed by the inventor, it has actually been confirmed that the best image is obtained when the fifth highest pixel value is employed. Further, it has also been turned out that the influence of a shadow is exerted when the sixth highest pixel value or the following highest pixel value is employed.

It is to be noted that the composition method and the average method are not limited to the above methods, and various methods can be used.

For example, the halation removing method and the average method described above may be combined, albedo values may be sorted, and values in a specific orders from the top may be employed. For example, the third and fourth values may be averaged.

Next, details of setting will be described. As described above, the characteristic size can be set when the contour extraction image is created. The contour extraction image can be an image suitable for OCR by setting the characteristic size to a predetermined value or larger.

(3-2. Gain)

In creating a contour extraction image or a texture extraction image, a pixel value of the original image can be multiplied by a gain in the process of creating each of these images.

The gain in the creation of the contour extraction image refers to a constant at the time of dispersing a pixel value calculated by calculation processing to a gradation of 0 to 255. For example, when a flaw or a contour is too shallow and thus difficult to grasp, a change in the gradation of the pixel value becomes larger by increasing a value of the gain. Thus, it becomes easy to grasp the flaw or the contour.

Further, the flaw or the contour becomes easy to grasp by adjusting the pixel value calculated by the calculation processing in such a manner that the pixel value is made fall within the range of 0 to 255 when the pixel value exceeds the range and the pixel value is expanded to the range of 0 to 255 when the pixel value is smaller than the range.

In the above halation removing method, albedo values are sorted, and, for example, the third highest value is employed. Thus, the brightness of the generated image cannot be estimated. Therefore, the image may become dark contrary to the estimation as a result of removal of regular reflection. Thus, in order to adjust the brightness, the pixel value is multiplied by a predetermined gain at the time of creating the texture extraction image.

It is to be noted that, also at the time of calculating an inclination image, the pixel value may be adjusted so as to fall within the range of 0 to 255 using a gain.

(3-3. Noise Removing Filter)

In creating an inclination image, calculation is performed by simultaneous equations using a plurality of images, and differential calculation is performed in practice. In this case, there is noise in image data captured by the imaging unit when the image data is raw data. Thus, in the creation of an inclination image, a noise component may be enhanced, which produces a rough contour. A noise removing filter such as a guided filter is used for reducing such noise. A common low pass filter may hide or remove not only noise, but also information of a flaw. On the other hand, the guided filter can remove noise while maintaining an edge at the time of obtaining the inclination image, which is preferable.

The image processing unit 41B functions as the source image generation section for generating a source image of the surface of the workpiece WK in an assumed illumination direction, which is obtained by assuming an illumination direction, using a pixel value of each of the pixels having the corresponding relationship between the plurality of partial illumination images captured by the imaging unit 11 on the basis of the photometric stereo method, in each of a plurality of different assumed illumination directions. Specifically, the source image generation section implements functions of the normal vector calculation unit 41a, the contour image generation unit 41b, the texture extraction image generation unit 41c, the inspection region specifying unit 41d, the image processing section operation unit 41e, the determination unit 37, and the illumination direction estimation unit 41g. The normal vector calculation unit 41a calculates a normal vector n with respect to the surface of the workpiece WK at each of pixels using a pixel value of each of pixels having a corresponding relationship between the plurality of partial illumination images captured by the imaging unit 11. The contour image generation unit 41b performs differential processing in the X direction and the Y direction on the calculated normal vector n at each of the pixels to generate a contour image that represents the contour of an inclination of the surface of the workpiece WK. The texture extraction image generation unit 41c calculates an albedo of each of the pixels from the calculated normal vector n at the corresponding pixel, the number of the calculated normal vectors n being the same as the number of times of illumination performed by the illumination unit, and generates a texture extraction image that represents a pattern obtained by eliminating the influence of an inclination of the surface of the workpiece WK from the albedos. The inspection region specifying unit 41d specifies the position of an inspection region to be inspected with respect to the generated contour image. The image processing section operation unit 41e performs image processing for detecting a flaw within the specified inspection region. The determination unit 37 determines the presence or absence of a flaw on the surface of the workpiece WK on the basis of a result of the processing. The illumination direction estimation unit 41g detects an illumination direction that has the highest consistency with an actual illumination direction in the illumination unit from a plurality of source images SP based on a plurality of images generated by the source image generation section.

The imaging unit 11 and the illumination unit can be disposed as separate members. This enables the layout to have a high flexibility. As an example, the imaging unit 11 with its optical axis aligned with a vertical direction is disposed immediately above the workpiece WK which is placed on a stage SG. Further, four illumination units, specifically, a first illumination unit 21, a second illumination unit 22, a third illumination unit 23, and a fourth illumination unit 24 are disposed at the same height in the four cardinal directions of north, south, east, and west of the imaging unit 11. The positional relationship between the disposed imaging unit 11 and each of the disposed illumination units is recorded in the image inspection apparatus 100B. The illumination control unit 26 sequentially turns on the illumination units at predetermined illumination timing, and the common imaging unit captures an image of the workpiece WK from a certain direction to acquire a partial illumination image.

It is to be noted that the configuration of the imaging unit 11 and the illumination unit is not limited to the configuration in which these units are separate members, and these units may be integrally configured through an arm or the like. In this case, since the positional relationship between the imaging unit 11 and the illumination unit is fixed in advance, an adjustment operation such as aligning the optical axes can be eliminated. However, the flexibility is lost.

(Imaging Unit 11)

For example, an imaging element such as a charge coupled device (CCD) camera or a complementary metal oxide semiconductor (CMOS) imager can be used as the imaging unit 11. The imaging element photoelectrically converts an image of a subject and outputs an image signal, and the signal processing block converts the output image signal to a luminance signal and a color difference signal and outputs the signals to the image processing unit 41B connected through the imaging cable 12.

(Illumination Unit)

The illumination units 21, 22, 23, 24 are arranged so as to surround the workpiece WK as illustrated in FIG. 1 so that illumination light can be applied to the workpiece WK from different illumination directions. Further, each of the illumination units is installed with its optical axis facing obliquely downward. It is preferred that the optical axis of the imaging unit 11 be aligned with a central axis of a plane (virtual rotation plane) where the illumination units are arranged so that the common imaging unit 11 can capture an image of the workpiece illuminated by each of the illumination units. Further, it is preferred that the illumination units be equally spaced at an angle (azimuth from the central axis) that is obtained by equally dividing 360° by the number of illumination units. Furthermore, the zenith angle is preferably constant in all the illumination units. Furthermore, the distance between each of the illumination units and the workpiece is preferably constant. This makes it possible to simplify input of information of the azimuth and the zenith angle which is required for an operation in photometric stereo processing. As described below, an all-lit image MC is captured in an all-lit state in which all the illumination units are ON. Thus, an image can be captured in an illumination state with less unevenness merely by equally reducing the intensity of all the illumination units with the above configuration.

In the example of FIG. 1, there are provided the four illumination units: the first illumination unit 21, the second illumination unit 22, the third illumination unit 23, and the fourth illumination unit 24. An incandescent lamp, a fluorescent lamp or the like can be used as each of the illumination units. In particular, a semiconductor light emitting element such as a light emitting diode (LED) is preferred because of its low power consumption, long life, and excellent responsivity.

The illumination color of the illumination units 21, 22, 23, 24 can also be changed in accordance with the type of the workpiece WK. For example, when a fine flaw is inspected, blue having a short wavelength is preferred. When a colored workpiece is inspected, white illumination is preferably used so that the color of illumination is not obstructive. Further, when oil is adhered to a workpiece, red illumination is preferably used so as to prevent the influence of the oil.

Further, it is sufficient to use at least three illumination units so as to illuminate the workpiece WK from three or more different illumination directions. When the number of illumination units is increased, the partial illumination images can be obtained from a larger number of illumination directions. Thus, the accuracy of an image inspection can be improved. For example, eight illumination units in total additionally including the northeast, northwest, southeast, and southwest directions may be arranged. Further, it is preferred that the illumination units be equally spaced at an angle (azimuth from the central axis) that is obtained by equally dividing 360° by the number of illumination units. Further, the zenith angle is preferably constant in all the illumination units. It is to be noted that an increase in the number of images that should be processed leads to an increase in the processing amount, which slows the processing time. In the present embodiment, the four illumination units are used as described above taking into consideration a balance between the processing speed, the easiness of operation processing, and the accuracy. Further, the illumination unit may include a plurality of light emitting elements which are annularly arranged. Furthermore, in addition to the annular arrangement, illumination units each of which is configured in a bar shape may be arranged in a rectangular form or in a polygonal form. Alternatively, the illumination units may also be arranged in a planar form in addition to circular or polygonal annular arrangement. For example, a large number of light emitting elements are arranged in a planar form and an illumination block to be turned on is changed, which makes it possible to achieve different illumination directions. As described above, the illumination unit and the illumination direction in the present invention are not limited to physically separated illuminators, and are used in the meaning of including a configuration in which illumination is performed by illumination blocks obtained by dividing one illumination unit into a plurality of blocks.

(Parameter Setting Unit in Photometric Stereo Method)

In such a photometric stereo method, it is necessary to set a characteristic size, a characteristic size margin degree, a contrast, a level, and noise removal as image processing parameters. Such setting of the image processing parameters is performed by the parameter setting unit 32. FIG. 4 illustrates, as an example of the parameter setting unit 32, a user interface screen (parameter setting screen 32B) which is used by a user for manually setting the image processing parameters in an image processing program. The parameter setting screen 32B illustrated in FIG. 4 includes a characteristic size setting field 32B1, a characteristic size margin degree setting field 32B2, a contrast setting field 32B3, a level setting field 32B4, and a noise removal setting field 32B5.

The characteristic size is a parameter that defines the size of asperities of the workpiece. For example, a flaw having a specified size is enhanced, and a projecting flaw is brightly displayed and a recessed flaw is darkly displayed by setting a small value when it is desired to detect a fine flaw on the workpiece and setting a large value when it is desired to enhance a large flaw.

Further, the characteristic size margin degree is a parameter for including asperities having a size different from the size of the asperities defined by the characteristic size.

Furthermore, the contrast is a parameter for enhancing the detected asperities.

Furthermore, the level is a parameter for defining a portion with no asperity. A height specified by the level serves as a reference plane, and the brightness of asperities is defined on the basis of the level. In this example, the level is represented by eight bits of 0 to 255. For example, when it is desired to inspect a projection by OCR, only a portion formed in a projecting shape can be extracted by setting the level to zero. On the other hand, when it is desired to inspect a recess, only a recessed portion can be extracted by setting the level to 255.

Finally, the noise removal is a parameter for removing minute asperities. The viewability is improved by removing asperities smaller than a size specified herein as noise from the detected asperities.

Second Embodiment: Flaw Inspection on Shape Image

Hereinabove, there has been described the method for obtaining the shape image, the contour extraction image, and the texture extraction image generated using the photometric stereo method as examples of an image to be an image inspection object. As described above, in the present invention, an image to be an image inspection object is not limited to an image based on the photometric stereo method, and another image can also be used. Here, as a second embodiment, an example in which the presence or absence of a flaw is inspected on the basis of a shape image will be described. The shape image includes information relating to the three-dimensional shape of a workpiece. Three-dimensional height information is acquired from an image of the workpiece captured by the imaging unit on the basis of the photometric stereo method or another method. A flaw inspection is not an area determination in a black-and-white image which is obtained by simple binarization, but a visual inspection algorithm for searching for a defect such as a flaw or dirt while performing comparison with a peripheral gradation level.

Hereinbelow, the principle of detection in a flaw inspection will be described. Here, description will be made with an example in which the X direction is designated as a flaw detection direction.

(1) First, an average density measurement is performed while moving a small region (segment) having any size by a predetermined amount within an inspection region. The moving amount can be determined on the basis of the size of the segment and, for example, ¼ of the segment size.

(2) Next, the difference between the maximum density and the minimum density within a predetermined distance in the detection direction including a segment of interest (here, four segments in the X direction) is measured. The measured value is a "flaw level" of the segment of interest.

(3) When the flaw level is higher than a threshold which is previously set, the segment of interest is counted as a flaw. The count value is an inspection result called a "flaw amount".

Thereafter, the above steps of (1) to (3) are repeatedly performed while shifting the segment of interest by the moving amount within the region.

In the above, the case in which the X direction is designated as the flaw detection direction has been described. The Y direction or the XY directions may also be designated as the flaw detection direction. Here, a processing method in a case where the two-dimensional XY directions are designated as the flaw detection direction will be described. When the XY directions are designated, the difference between the maximum density and the minimum density is measured within four segments in each of the XY directions including the segment of interest, that is, sixteen segments in total.

Figure 17:
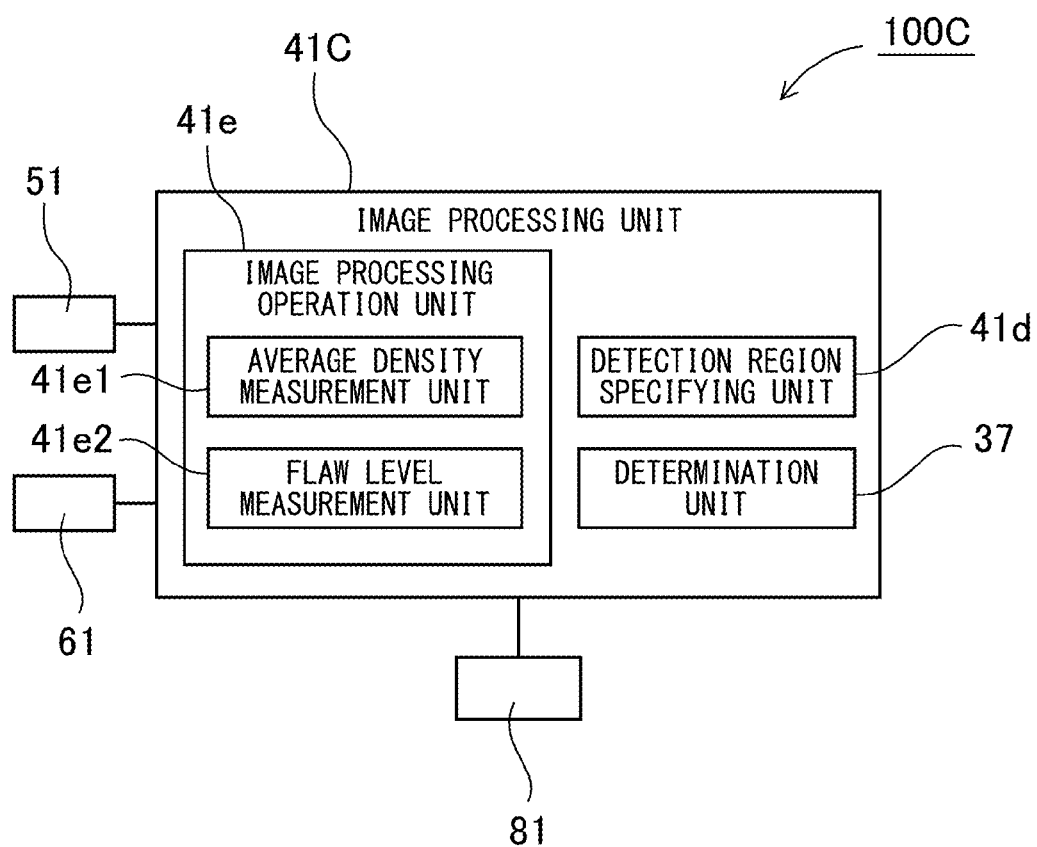
FIG. 17 is a functional block diagram illustrating an image processing unit of an image inspection apparatus that performs a flaw inspection.

According to the flaw inspection, it is possible to detect only a defect that should be detected without the influence of the shape of a workpiece or illumination unevenness. A configuration substantially similar to the configuration of the above first embodiment can be used as a hardware configuration of an image inspection apparatus that performs such a flaw inspection. FIG. 17 is a functional block diagram illustrating an image processing unit 41C of an image inspection apparatus 100C which performs the flaw inspection. A member common between FIG. 17 and FIG. 10 is designated by the same reference sign, and a detailed description thereof will be appropriately omitted. The image processing unit 41C illustrated in FIG. 17 is provided with an image processing operation unit 41e, an inspection region specifying unit 41d, and a determination unit 37. The inspection region specifying unit 41d is a member for specifying the position of an inspection region to be inspected with respect to an image.

The image processing operation unit 41e is provided with an average density measurement unit 41e1 and a flaw level measurement unit 41e2. The average density measurement unit 41e1 is a member for performing an average density measurement while moving a segment having any size by a predetermine amount within the inspection region specified by the inspection region specifying unit 41d. The flaw level measurement unit 41e2 measures, as a flaw level, the difference between the maximum average density and the minimum average density which are measured by the average density measurement unit 41e1 at each position (each segment of interest) included within a certain distance in the detection direction.

The determination unit 37 is a member for performing predetermined image processing and outputting a determination result of a visual inspection on the basis of a result of the processing. When the flaw level measured by the flaw level measurement unit 41e2 is larger than a threshold which is previously set, the segment of interest is counted as a flaw, and the count value is output as a "flaw amount".

(Parameter Setting Unit in Flaw Inspection)

Examples of an image processing parameter that should be set when such a flaw inspection is performed include a detection direction, direction-classified setting, ON/OFF of a high-speed mode, a flaw level, a setting direction, a segment size, comparison interval setting, a moving amount, and a comparison segment interval. Setting of such image processing parameters is performed by the parameter setting unit 32 similarly to the above. FIG. 5 illustrates, as an example of the parameter setting unit 32, a user interface screen (parameter setting screen 32C) which is used by a user for manually setting the image processing parameters in the image processing program. The parameter setting screen 32C illustrated in FIG. 5 includes a detection direction setting field 32C1, a direction-classified setting setting field 32C2, a high-speed mode ON/OFF setting field 32C3, a flaw level setting field 32C4, a setting direction setting field 32C5, a segment size setting field 32C6, a comparison interval setting setting field 32C7, a moving amount setting field 32C8, and a comparison segment interval setting field 32C9.

The detection direction is a parameter that indicates an extending direction of a flaw. Here, any of the XY, X, and Y directions is selected from a drop-down list. For example, when a flaw extends in the vertical direction, the flaw can be detected taking the difference in the horizontal direction by selecting the X direction.

The direction-classified setting is designated when it is desired to set the image processing parameter to different values between the X and Y directions.

The high-speed mode is a parameter for switching ON/OFF of speedup of processing. When the high-speed mode is ON, although a value that can be selected as an image processing parameter is limited (e.g., a multiple of 4), the speed of internal processing is increased.

The flaw level is a parameter that defines a difference with an average density of surrounding pixels that is determined as a flaw. For example, when 10 is designated as illustrated in FIG. 5, a flaw having a pixel whose difference with the average density of surrounding pixels is less than 10 is not determined as a flaw and a flaw having a pixel whose difference is 10 or more is determined as a flaw.

The setting direction is in conjunction with the direction-classified setting. When the direction-classified setting is OFF, the following image processing parameter is set in common in directions set in the detection direction (common in XY directions in the example of FIG. 5). When the direction-classified setting is ON, the following image processing parameter is individually set in each direction.

The segment size is a parameter that is defined according to the size of a flaw. For example, in the example of FIG. 5, 16 is designated as the segment size. In this case, a region of 16×16 is taken around a part of a shape image to be inspected, the region is divided into four regions, and a difference in each region is taken to determine a flaw amount.

In this manner, the segment size is a parameter that defines the size of a region where a flaw is detected and serves as a parameter relating to the size of a workpiece similarly to the characteristic size in the photometric stereo method.

In the comparison interval setting, manual or automatic setting is selected.

In the moving amount, a comparison interval is moved by each designated pixel (4 pixels in this example).

The comparison segment interval defines an interval between segments in which a density difference is compared.

(Image Processing Parameter Setting Method)

In order to perform the image inspection as described above, it is conventionally necessary to appropriately set the image processing parameters according to the contents of the inspection. For example, when image processing based on the photometric stereo method is used, as illustrated in the picture of FIG. 4, there are a large number of image processing parameters, and it is not easy to specifically estimate, only from the name of each image processing parameter, what kind of parameter the parameter is, and which part of the image is changed and how the part is changed by adjusting the parameter. That is, in the example of FIG. 4, the image processing parameters include the characteristic size, the characteristic size margin degree, the contrast, the level, and the noise removal, and a user generally inputs a numerical value or makes a selection from options in a check box or a drop-down menu with respect to each of the parameters. However, it is not easy to know which one of the large number of listed image processing parameters should be set and how the setting should be performed to obtain a desired image inspection result. For example, it is not easy for a beginner user to immediately learn the characteristic size and the characteristic size margin degree.

Similarly, examples of the flaw detection condition setting parameter in a case where the flaw inspection is used include items as illustrated in the image view of FIG. 5. Here, the items include the detection direction, the direction-classified setting, the ON/OFF of the high-speed mode, the flaw level, the setting direction, the segment size, the comparison interval setting, the moving amount, and the comparison segment interval. Conventionally, a user sets such a large number of parameters one by one in the parameter setting screen 32C as illustrated in FIG. 5. This operation is extremely complicated, and it is not easy to obtain a desired image processing result unless the user sufficiently understands the meaning of each of the parameters and the relationship with another parameter.

As described above, in a conventional image processing parameter setting method, a user needs to change each image processing parameter by himself or herself and to check whether the values are suitable for the inspection one by one, which makes the derivation of an image processing parameter suitable for the inspection complicated. Further, the degree of difficulty of the setting derivation varies depending on whether a user knows the meaning of each image processing parameter in the image processing, the influence on a processed image, and setting know-how of the image processing parameters in each inspection purpose. Thus, the degree of difficulty of the derivation of setting suitable for the inspection depends on the knowledge, technique, and experience of a user who performs the setting.

Thus, in the present embodiment, it is possible to easily perform the derivation of setting parameters suitable for an inspection by repeatedly performing a procedure of selecting an inspection purpose and selecting an image suitable for the inspection from a plurality of images obtained by changing parameters in setting the image processing parameters. This state will be described with reference to the flowchart of FIG. 6 and user interface screens of FIGS. 7, 8, and 9. Here, a case in which a first parameter a and a second parameter b are set as image processing parameters for executing image processing will be considered. The first parameter a includes a parameter relating to the direction of the image processing. The second parameter b includes a parameter relating to the size of a workpiece.

The parameter relating to the workpiece size is a parameter that defines the size of a flaw to be detected. The image processing parameters are set so that an object having a size corresponding to the parameter set herein is detected, in other words, information of shape or height that is required in an intended visual inspection is not lost in a processed image on which the image processing has been performed. For example, when it is desired to detect a large flaw, shape information included in a shape image which is generated on the basis of the photometric stereo method requires maintaining the characteristic amount or information that enables the extraction of a large flaw, in other words, information relating to a small flaw is not required. Thus, the accuracy of the shape information is adjusted so as to lose the characteristic amount relating to the information of a small flaw. On the other hand, when it is desired to detect a small flaw, the image processing parameters are adjusted so that the processed image holds the characteristic amount or information relating a small flaw and ignores a large flaw.

Figure 6:
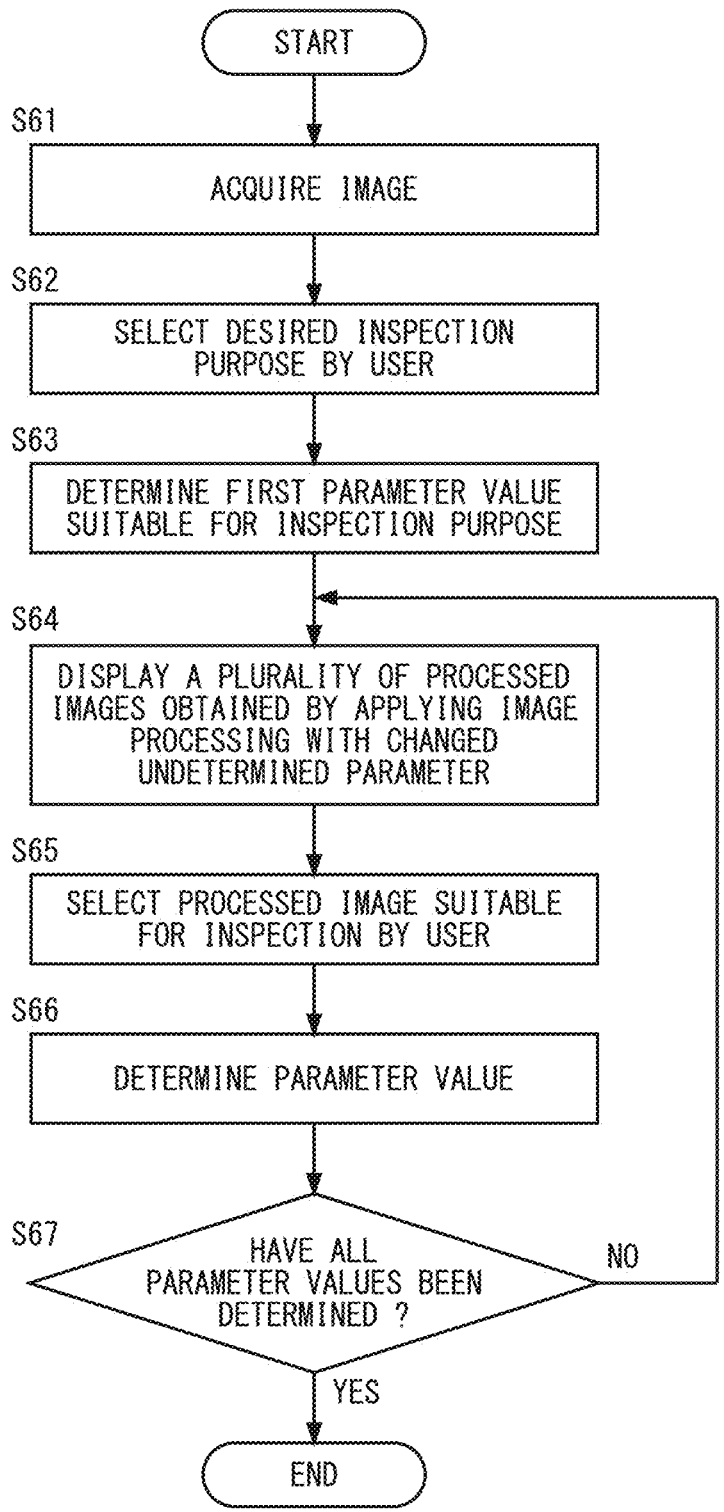
FIG. 6 is a flowchart illustrating a procedure of an image inspection method.

First, in the flowchart of FIG. 6, an image to be inspected is acquired in step S61.

For example, the illumination unit applies illumination light to a workpiece to be inspected, and the imaging unit 11 acquires a multilevel image.

Figure 7:
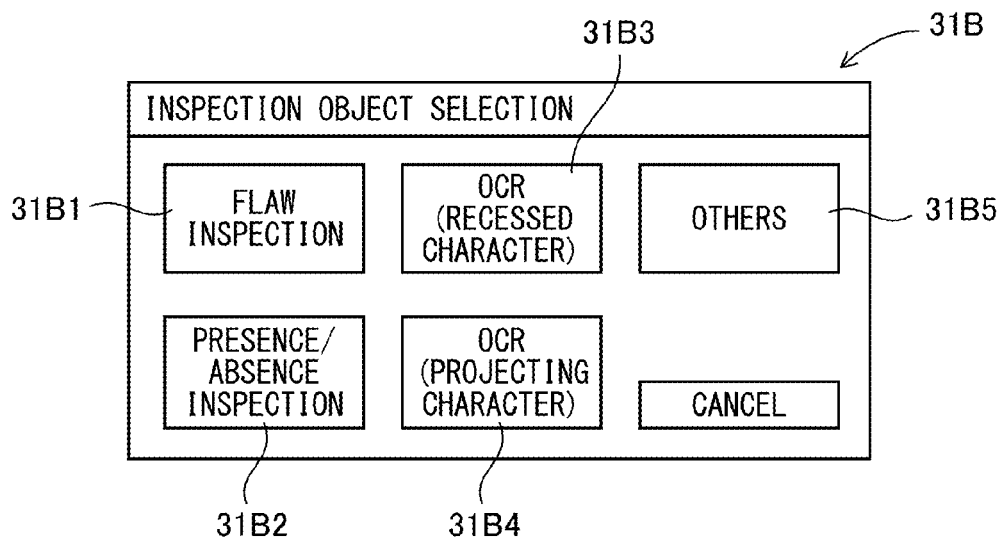
FIG. 7 is an image view illustrating a screen for selecting an inspection purpose.

Next, in step S62, a user selects a desired inspection purpose. Here, the inspection type selection unit 31 is used. FIG. 7 illustrates an example of a user interface of the inspection type selection screen 31B as one embodiment of the inspection type selection unit 31. In this manner, a plurality of typical inspection purposes of image processing are presented in the inspection type selection screen 31B, and a user selects a desired one of the inspection purposes therein. Here, as selectable inspection purposes, any one of a flaw inspection 31B1, a presence/absence inspection 31B2, an OCR (recessed character) 31B3, an OCR (projecting character) 31B4, and "others" 31B5 are selectable.

Next, in step S63, an image processing parameter value suitable for the inspection purpose is determined. Here, the first parameter a is set by the parameter setting unit 32 according to the selected inspection type. For example, a gradation value (level) of a reference plane which serves as a reference of a height determination within the workpiece to be detected is set to any of 0 to 255 as the first parameter a.

In this case, when the OCR (projecting character) 31B4 is selected in the inspection type selection screen 31B of FIG. 7, the parameter setting unit 32 sets the level to zero. When the OCR (recessed character) 31B3 is selected, the level is set to 255. Further, the level is set to 128 when the flaw inspection is selected, and is set to zero when the presence/absence inspection 31B2 is selected. A case will be described below where the "others" 31B5 is selected.

Figure 8:
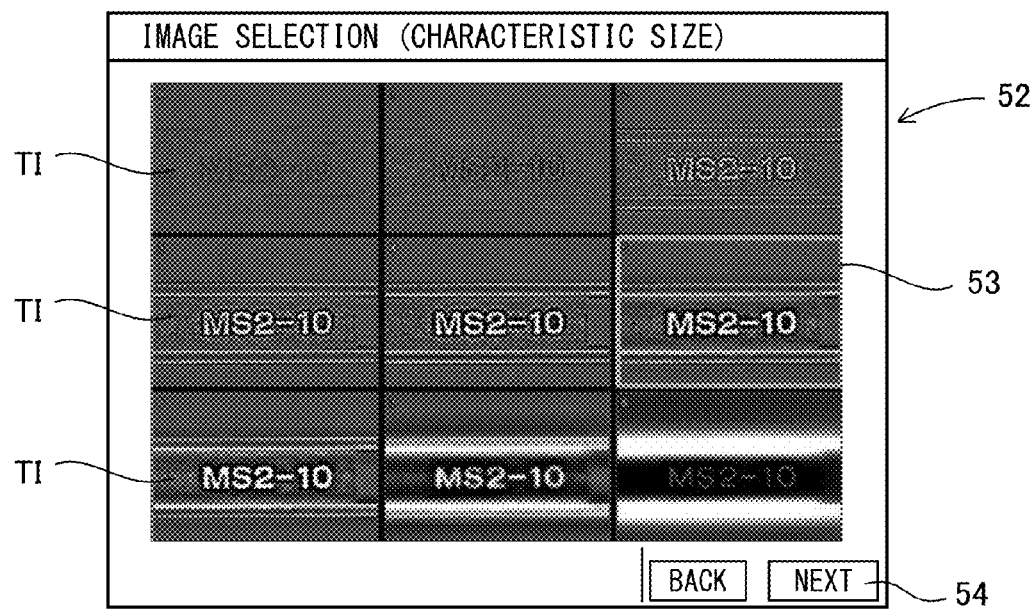
FIG. 8 is an image view illustrating an example of an image selection screen.

Next, in step S64, a plurality of processed images obtained by applying image processing with a changed undetermined image processing parameter are displayed as a parameter candidate list image group. Here, the image generation unit 34 generates the processed images by applying image processing with the second parameter b changed to a plurality of different candidate values by the parameter setting unit 32, and the generated processed images are displayed on the display unit 51. The type and the change width of the second parameter b are previously set. The processed images generated with the respective values of the second parameter b are arranged on the display unit 51 and displayed as a list as a second parameter candidate list image group. FIG. 8 illustrates an example of the second parameter candidate list image group 52. Here, nine processed images TI in total in 3 rows×3 columns with changed characteristics sizes as the second parameter are displayed. In this example, the image processing parameters other than the "characteristic size" are fixed to default values, and the "characteristic size" is changed to 2, 4, 8, 12, 16, 24, 32, 64, and 128 to generate the processed images TI. The processed images TI constantly represent the same region where an image of the workpiece is captured. Further, the scaling and scrolling of the images can be performed as needed. In this case, it is preferred that scaling and scrolling operations for an image display range be applied to all the images in common so as to easily make a comparison between the processed images TI.

As the second parameter, the segment size may be changed as a parameter relating to the workpiece size in addition to the characteristic size. Alternatively, as the second parameter, the size of a flaw (character) to be detected or the change width of a gain may be changed. Further, the second parameter may be changed on the basis of the inspection type selected by the inspection type selection unit 31. Further, when the parameter setting unit 32 changes the image processing parameter, the width or pitch of the image processing parameter may be changed. In this example, when the second parameter is changed, the contrast of the image is changed on the basis of the inspection type selected by the inspection type selection unit 31.

In this state, in step S65, a user selects one of the processed images TI suitable for the inspection. Here, a user can select the desired processed image TI from the second parameter candidate list image group 52 which is displayed on the display unit using the image selection unit 36.

The image selection unit 36 is a member for receiving an operation by a user. For example, a touch panel, a mouse, a keyboard, or a console is operated to designate the desired processed image TI. Here, it is preferred to add an indicator that facilitates determining which one of the processed images TI is currently selected by a user. In the example of FIG. 8, the selected processed image TI is surrounded by a frame 53.

When the selection has been finished, a "NEXT" button 54 which is disposed at the bottom right of the screen of FIG. 8 is depressed. Accordingly, in step S66, a value of the second parameter is determined. Here, a candidate value of the second parameter that is set in the processed image TI selected by a user is specified, and the parameter setting unit 32 sets the candidate value as the second parameter.

Further, in step S67, it is determined whether values of all the image processing parameters have been determined. When NO, a return to step S64 is made, and the above processing is repeated. For example, when only the first parameter a and the second parameter b are set, the processing is finished.

(Third Parameter)

Figure 9:
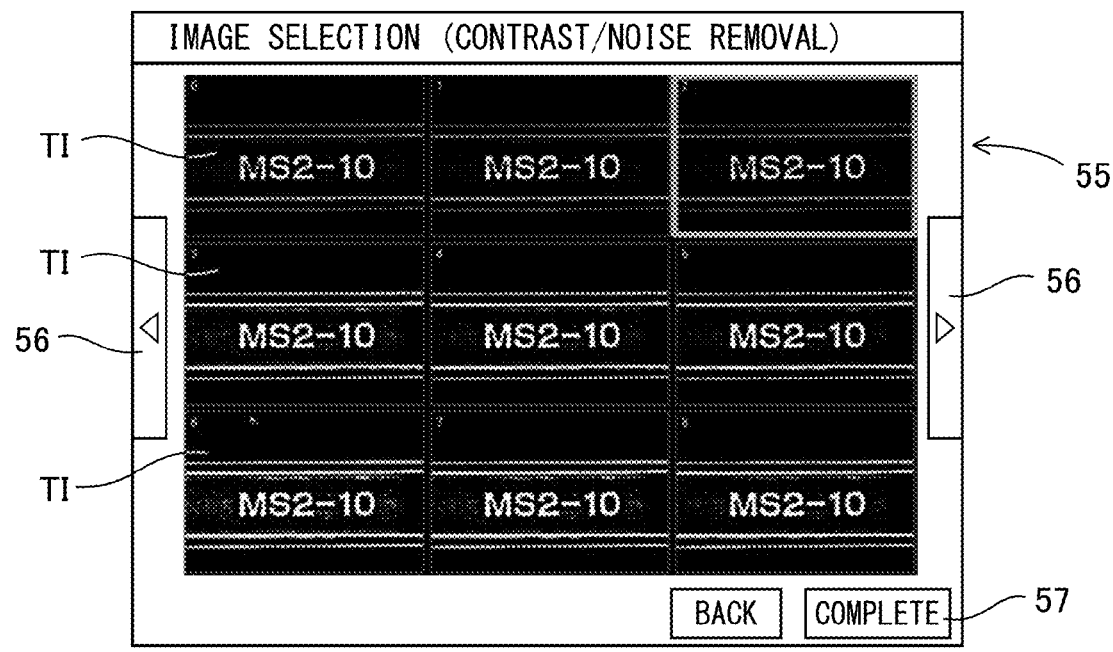
FIG. 9 is an image view illustrating another example of the image selection screen.

On the other hand, when a third parameter c is also set in addition to the above, a return from step S67 to step S64 is made. In step S64, a plurality of processed images obtained by applying image processing with an undetermined image processing parameter, in this example, a value of the third parameter c changed to a plurality of different candidates values are displayed. Here, since the first parameter a and the second parameter b have already been determined, the parameter setting unit 32 changes only the third parameter c to a plurality of different candidate values, and the image generation unit 34 generates processed images. Then, the generated processed images are displayed on the display unit as a third parameter candidate list image group. For example, when the "NEXT" button 54 is depressed on the screen of FIG. 8, a third parameter candidate list image group 55 of FIG. 9 is displayed. In this manner, the "NEXT" button 54 has a function of simultaneously executing the selection of the second parameter and the switching to the third parameter selection screen.

For example, an image processing parameter for enhancing a detection object is employed as the third parameter. For example, a parameter such as a contrast or noise removal for enhancing a workpiece to be detected so that a portion that is desired to be seen stands out and an object that is not desired to be seen is reduced or weakened is suitably selected. Here, the contrast is set as the third parameter c. A value of the third parameter (contrast) is changed on the basis of the inspection type selected by the inspection type selection unit 31. For example, when the flaw inspection is selected as an inspection purpose, the contrast is change to 1, 2, and 4. On the other hand, the presence/absence inspection 31B2 is selected, the contrast is changed to 2, 4, and 6. Further, when the OCR (recessed character) 31B3 is selected, the contrast is changed to 2, 4, and 6. Furthermore, when the OCR (projecting character) 31B4 is selected, the contrast is changed to 2, 4, and 6.

In addition, in the example of FIG. 9, the noise removal is also changed as a fourth parameter. Here, the noise removal is changed to five kinds of 0, 5, 10, 15, and 20 with respect to each of the images with the three kinds of changed contrast values to generate fifteen processed images in total. In the display example of FIG. 9, nine processed images TI in 3 rows×3 columns are displayed in one screen, and undisplayed processed images TI can be displayed by depressing scrolling buttons 56 which are disposed at right and left of the screen.

Thereafter, similarly, in step S65, a user selects one of the processed images TI suitable for the inspection. When a "COMPLETE" button 57 is depressed, a shift to step S66 is made, and a third parameter candidate value set in the selected processed image TI is determined as the third parameter. Further, in step S67, it is determined whether values of all the image processing parameters have been determined. When there is an undetermined image processing parameter, a return to step S64 is made, and the above processing is repeated. In this manner, in the present invention, the number of settable image processing parameters is not limited to two and may be three or more.

When the first parameter a, the second parameter b, and the third parameter c are set, the third parameter c is fixed to a default value when the second parameter b is changed to a plurality of different candidate values to generate processed images in step S64 for the first time.

When values of all the image processing parameters have been determined as described above, the processing is finished. According to this method, a user can visually grasp a picture of an already obtained image. Thus, it is possible to select an image corresponding to the inspection purpose from the result.

In the above method, any one of the plurality of image processing parameters is changed to generate processed images, and the processed images are displayed as a list. The present invention is not limited to this configuration, and the plurality of image processing parameters may be simultaneously changed, and processed images may be displayed as a list. In this case, when the number of image processing parameter candidate values is the same as above, the number of processed images increases. Thus, when the parameter candidate list image group is displayed on the same display unit as above, the size of one processed image is reduced. In this case, the visibility is reduced. Thus, for example, a part of any processed image may be displayed in an enlarged manner by placing a cursor on this part. For example, an enlarged processed image is displayed within a sub window of a magnifier. In the case of a touch panel, a user may move a finger on any processed image so that a partially enlarged image is displayed similarly to the above. Alternatively, the screen of the parameter candidate list image group may be scrolled so that the entire parameter candidate list image group is displayed or the screen itself may be switched. Alternatively, the number of image processing parameter candidate values may be reduced to prevent an increase in the number of processed images included in the parameter candidate list image group.

Here, an example in which a plurality of parameters are simultaneously changed and a parameter candidate list image group is displayed will be described on a case in which the "others" 31B5 is selected on the inspection type selection screen 31B of FIG. 7. Here, the level is set as the first parameter, the characteristic size is set as the second parameter, and the contrast is set as the third parameter. Further, the first parameter (level) and the third parameter (contrast) are simultaneously changed. First, three processed images obtained by changing the first parameter (level) to 0, 128, and 255 with the second parameter (characteristic size) fixed to a default value, for example, a value determined in step S66 when already determined are displayed. Further, the third parameter (contrast) is also changed for each first parameter (level). For example, when the first parameter (level) is 128, the third parameter (contrast) is changed to 1, 2, and 4. Further, when the first parameter (level) is 0, 255, the third parameter (contrast) is changed to 2, 4, and 6. In this manner, nine types of images in total are generated, and a first and third parameter candidate list image group is displayed. Further, a user selects one of the processed images suitable for the inspection. Accordingly, the first parameter (level) and the third parameter (contrast) in the selected processed image are determined.

(Flaw Inspection Parameter Setting Example)

The method for setting the image processing parameters in the image inspection by the photometric stereo method has been described above. Next, a method for setting image processing parameters in a flaw inspection will be described. Here, a procedure of determining a first parameter "detection direction", a second parameter "segment size", and a third parameter "flaw level" as image processing parameters in the flaw inspection will be described.

First, an inspection content is selected. Here, a user selects a desired inspection from "stain and dirt detection", "dent detection" and "streak detection". An image processing parameter and a change width of the image processing parameter are determined according to the inspection type selected by the user. For example, when the "stain and dirt detection" is selected, the first parameter "detection direction" is set to the XY directions, and the second parameter "segment size" is changed to candidate values of 12, 16, 20, 24, 28, 32, 36, 40, and 44.

On the other hand, when the "dent detection" is selected as the inspection type, the first parameter "detection direction" is set to the XY directions, and the second parameter "segment size" is changed to candidate values of 4, 8, 12, 16, 20, 24, 28, 32, and 36.

Further, only when the "streak detection" is selected as the inspection type, a step of receiving a selection of "image selection (detection direction)" is added. Here, five processed images obtained by changing the "detection direction" to the X direction, the Y direction, XY directions, the circumferential direction, and the radial direction are displayed, and a user selects one of the images suitable for the inspection. The candidate value of the "detection direction" set in the selected processed image is determined by the selection. Further, the second parameter "segment size" is changed to candidate values of 4, 8, 12, 16, 20, 24, 28, 32, and 36.

Next, nine processed images obtained by changing the second parameter "segment size" to the above determined candidate values with the first parameter "detection direction" fixed to the determined value are displayed, and a user selects one of the processed images suitable for the inspection. The candidate value set in the selected processed image is determined as the second parameter "segment size".

In this manner, the processed images obtained by changing the third parameter "flaw level" to candidate values of 5, 10, 15, 20, 25, 30, 35, 40, and 45 with the first parameter "detection direction" and the second parameter "segment size" fixed to the determined values by the parameter setting unit 32 are displayed as the parameter candidate list image group, and a user selects one of the processed image suitable for the inspection. Accordingly, the third parameter "flaw level" is determined according to the selected processed image. In this manner, the image processing parameters for the flaw inspection can also be selected from a result of processed images obtained by changing the image processing parameters similarly to the above. Thus, the image processing parameters can be set to values in accordance with an image picture desired by a user, and an image processing parameter setting operation which has been conventionally burdensome can be simplified.

That is, in a conventional setting method, it is necessary for a user to change each image processing parameter by himself or herself, and the setting derivation is thus disadvantageously complicated. On the other hand, according to the image inspection method according to the present embodiment, a user selects any one of processed images obtained by changing an image processing parameter to sequentially determine each image processing parameter. Thus, it is not necessary for a user to change the image processing parameter by himself or herself, and the setting can be easily derived. That is, the conventional method has a problem that the degree of setting difficulty varies depending on whether a user knows the meaning of each parameter in the image processing and setting know-how of the image processing parameters in each inspection purpose. On the other hand, according to the present embodiment, setting can be performed merely by selecting a displayed image. Thus, a user can perform setting without being conscious of the meaning of each parameter. So to speak, an excellent advantage that a condition for obtaining a desired image can be easily set by performing setting from a result of obtained processed images is achieved. Further, according to the present embodiment, an inspection purpose is first selected, and parameter setting suitable for the inspection purpose is automatically performed. Thus, anyone can derive setting suitable for the inspection without depending on the knowledge, experience, and technique of a user.

The image inspection apparatus, the image inspection method, the image inspection program, and the computer-readable recording medium or the recording device of the present invention can be preferably used for an inspection apparatus or a digitizer that uses photometric stereo.

What is claimed is:

1. An image inspection apparatus for performing a visual inspection of an inspection object, the image inspection apparatus comprising:
    an image input unit for receiving input of an image of the inspection object;
    an inspection type selection unit for receiving a selection of a desired inspection type from a plurality of inspection types previously prepared as candidates for the visual inspection of the inspection object;
    a parameter setting unit for automatically setting a value of a first parameter according to the inspection type selected by the inspection type selection unit among a plurality of image processing parameters relating to image processing performed on the inspection object image;
    an image generation unit for generating a plurality of processed images by changing a value of a second parameter different from the first parameter to a plurality of candidate values and performing image processing on the inspection object image with each of the changed second parameter candidate values;
    a display unit for displaying a second parameter candidate list image group in which the plurality of processed images generated by the image generation unit are listed;
    an image selection unit for receiving a selection of any one of the plurality of processed images included in the second parameter candidate list image group displayed on the display unit; and a determination unit for outputting a determination result of the visual inspection, wherein the parameter setting unit sets a second parameter candidate value corresponding to the processed image selected by the image selection unit as the second parameter, predetermined image processing is performed on the processed image generated by the image generation unit, and the determination unit outputs the determination result on the basis of a result of the processing.

2. The image inspection apparatus according to claim 1, further comprising:

three or more illumination units for illuminating the inspection object from mutually different illumination directions;

an illumination control unit for turning on the three or more illumination units one by one in a predetermined turning-on order; and an imaging unit for capturing an image of the inspection object from a certain direction at illumination timing of turning on each of the illumination units by the illumination control unit to capture a plurality of partial illumination images, wherein the plurality of partial illumination images captured by the imaging unit are input to the image input unit, and a shape image having a pixel value corresponding to shape is generated on the basis of the plurality of partial illumination images in accordance with a principle of a photometric stereo method, the first parameter defines a gradation value of a reference plane within the shape image, and the second parameter defines a size of a detection object within the shape image.

3. The image inspection apparatus according to claim 2, wherein the reference plane is specified within the shape image on the basis of a plane having no asperity.

4. The image inspection apparatus according to claim 3, wherein the inspection type selected by the inspection type selection unit includes at least any one of an inspection of a flaw on the inspection object, a determination of the presence or absence of the inspection object, optical reading of a character string displayed on the inspection object, the presence or absence of dirt included in the inspection object, the presence or absence of a dent included in the inspection object, and the presence or absence of a streak included in the inspection object.

5. The image inspection apparatus according to claim 4, wherein the first parameter is set by setting the gradation value of the reference plane to a median value in response to a selection of the inspection of a flaw on the inspection object as the inspection type by the inspection type selection unit.

6. The image inspection apparatus according to claim 4, wherein the first parameter is set by setting the gradation value of the reference plane to zero in response to a selection of the determination of the presence or absence of the inspection object as the inspection type by the inspection type selection unit.

7. The image inspection apparatus according to claim 4, wherein the first parameter is set by setting the gradation value of the reference plane to a minimum value in response to a selection of the optical reading of a character string displayed in a projecting shape on the inspection object as the inspection type by the inspection type selection unit.

8. The image inspection apparatus according to claim 4, wherein the first parameter is set by setting the gradation value of the reference plane to a maximum value in response to a selection of the optical reading of a character string displayed in a recessed shape on the inspection object as the inspection type by the inspection type selection unit.

9. The image inspection apparatus according to claim 1, wherein the inspection type selection unit is capable of selecting an inspection of a flaw on the inspection object with respect to a shape image including information relating to shape as the inspection type.

10. The image inspection apparatus according to claim 9, wherein the first parameter is a detection direction of a flaw as the detection object.

11. The image inspection apparatus according to claim 1, wherein the second parameter is a characteristic size or a segment size of the inspection object.

12. The image inspection apparatus according to claim 9, wherein the second parameter is a size of a flaw as the detection object.

13. The image inspection apparatus according to claim 1, wherein the image generation unit changes a width or a pitch for the change of the second parameter in generation of the plurality of processed images.

14. The image inspection apparatus according to claim 1, wherein the image generation unit changes a change width of a contrast of an image of the inspection object on the basis of the inspection type selected by the inspection type selection unit as the second parameter.

15. The image inspection apparatus according to claim 1, wherein the parameter setting unit sets a value of the second parameter corresponding to the processed image selected by the image selection unit and the set value of the second parameter is displayable on the display unit.

16. The image inspection apparatus according to claim 15, further comprising a parameter fine adjustment unit for manually adjusting a value of the second parameter set by the parameter setting unit.

17. The image inspection apparatus according to claim 16, wherein the second parameter candidate list image group displayed as a list on the display unit is updated and displayed again on the basis of the second parameter adjusted by the parameter fine adjustment unit.

18. The image inspection apparatus according to claim 1, further comprising an image recommendation unit that calculates a predetermined evaluation value for each of the processed images displayed in the second parameter candidate list image group on the display unit and recommends an image that should be selected on the basis of the evaluation value.

19. The image inspection apparatus according to claim 18, wherein the evaluation value calculated by the image recommendation unit is displayable on the display unit.

20. The image inspection apparatus according to claim 1, wherein a plurality of processed images are generated by changing a third parameter that is an image processing parameter different from the first parameter and the second parameter with the first parameter and the second parameter set by the parameter setting unit and displayed as a list as a third parameter candidate list image group on the display unit.

21. The image inspection apparatus according to claim 20, wherein the third parameter is a parameter for processing for enhancing the detection object.

22. An image inspection method that performs a visual inspection of an inspection object, the image inspection method comprising the steps of;

receiving a selection of a desired inspection type from a plurality of inspection types previously prepared as candidates for the visual inspection of the inspection object;

receiving input of an image of the inspection object, automatically setting a value of a first parameter according to the inspection type selected by the inspection type selection unit among a plurality of image processing parameters relating to image processing performed on the inspection object image, generating a plurality of processed images by changing a value of a second parameter different from the first parameter and performing image processing on the inspection object image with each of the changed second parameter values, displaying the plurality of generated processed images as a list on a display unit, and receiving a selection of any one of the plurality of displayed processed images; and setting a value of the second parameter corresponding to the processed image selected by the image selection unit by the parameter setting unit.

* * * * *